United States Patent
Eto et al.

(10) Patent No.: US 8,917,975 B2
(45) Date of Patent: Dec. 23, 2014

(54) MOVING PICTURE/STILL PICTURE PROCESSING SYSTEM, SERVER, MOVING PICTURE/STILL PICTURE PROCESSING METHOD, AND PROGRAM

(75) Inventors: Masami Eto, Tokyo (JP); Rika Shimizu, Tokyo (JP); Yumi Honaga, Tokyo (JP)

(73) Assignee: Biglobe Inc., Tokyo (JP)

( * ) Notice: Subject to any disclaimer, the term of this patent is extended or adjusted under 35 U.S.C. 154(b) by 92 days.

(21) Appl. No.: 13/508,546

(22) PCT Filed: Nov. 1, 2010

(86) PCT No.: PCT/JP2010/069403
§ 371 (c)(1),
(2), (4) Date: May 8, 2012

(87) PCT Pub. No.: WO2011/058897
PCT Pub. Date: May 19, 2011

(65) Prior Publication Data
US 2012/0219272 A1  Aug. 30, 2012

(30) Foreign Application Priority Data
Nov. 11, 2009  (JP) .................................. 2009-257909

(51) Int. Cl.
| | |
|---|---|
| *H04N 5/93* | (2006.01) |
| *G11B 27/034* | (2006.01) |
| *H04N 21/2668* | (2011.01) |
| *H04N 21/2343* | (2011.01) |
| *H04N 21/478* | (2011.01) |
| *H04N 21/81* | (2011.01) |

(52) U.S. Cl.
CPC .......... *H04N 21/2343* (2013.01); *G11B 27/034* (2013.01); *H04N 21/2668* (2013.01); *H04N 21/478* (2013.01); *H04N 21/8153* (2013.01)
USPC ........................................................ 386/278

(58) Field of Classification Search
USPC .......... 386/200, 212, 213, 239, 240, 248, 278
See application file for complete search history.

(56) References Cited

U.S. PATENT DOCUMENTS

| | | | | |
|---|---|---|---|---|
| 2001/0004417 | A1* | 6/2001 | Narutoshi et al. ............... | 386/52 |
| 2002/0165821 | A1* | 11/2002 | Tree ................................ | 705/39 |

(Continued)

FOREIGN PATENT DOCUMENTS

| | | |
|---|---|---|
| JP | 2001-309108 | 11/2001 |
| JP | 2003-92706 | 3/2003 |

(Continued)

OTHER PUBLICATIONS

International Search Report, PCT/JP2010/069403 dated Nov. 30, 2010.

*Primary Examiner* — Tat Chio
(74) *Attorney, Agent, or Firm* — Young & Thompson

(57) ABSTRACT

A moving picture/still picture processing system includes a server and communication terminal communicating by network with the server. The communication terminal sends the server a request causing the server to decorate the picture according to a designated decoration method. When the server receives the request, the server generates request identification information (RII) identifying the request, stores the decoration method designated in the request and correlated with the RII, and transmits the RII to the communication terminal. When the communication terminal receives the RII, the communication terminal adds the RII to the picture and transmits it to the server. When the server receives the picture from the communication terminal, the server decorates the picture according to the decoration method corresponding to the RII that added to the picture, stores the decorated picture, and delivers the decorated picture that corresponds to a delivery request.

17 Claims, 38 Drawing Sheets

(56) References Cited

U.S. PATENT DOCUMENTS

2003/0112259 A1* 6/2003 Kinjo .......................... 345/700
2004/0126095 A1* 7/2004 Tsumagari et al. ............ 386/95
2008/0263583 A1* 10/2008 Heath .......................... 725/32

FOREIGN PATENT DOCUMENTS

| JP | 2003-244425 | 8/2003 |
| JP | 2007-322940 | 12/2007 |
| JP | 2008-172734 | 7/2008 |

* cited by examiner

Fig.6

| effect program DB | | |
|---|---|---|
| effect identifier | effect program | remarks |
| effect X | program X | display the material at a designated position at a designated time |
| effect Y | program Y | display the material so as to move the material corresponding to a moving portion |
| effect Z | program Z | display the material so as to paint the material with a color at a moving position |
| ⋮ | ⋮ | ⋮ |

Fig.7

| user DB | | | | |
|---|---|---|---|---|
| order key | | content of order | | |
| plain order key | hashed order key | user ID | article ID | order date and time |
| u001s00120090917 | 0bz9c7fqa4 | u001 | s001 | 2009/09/17 |
| u001s00220090917 | 1cz9c7fqa4 | u001 | s002 | 2009/09/17 |
| u002s00120090917 | 0bz9c7fqb5 | u002 | s001 | 2009/09/17 |
| ⋮ | ⋮ | ⋮ | ⋮ | ⋮ |

205a

| article DB |||||||
|---|---|---|---|---|---|
| article ID | CPID | decoration article name | scenario identifier | material | sample moving picture |
| s001 | c001 | article A | scenario P | 001.png、002.png | sd1.mov |
| s002 | c003 | article B | | 003.png、oo4.png | sd2.mov |
| s003 | | article C | scenario Q | 001.png、005.png | sd3.mov |
| ⋮ | ⋮ | ⋮ | ⋮ | ⋮ | ⋮ |

205b

| | | moving picture/still picture DB | | |
|---|---|---|---|---|
| user ID | received moving picture/still picture | URL | decoration completion flag | browse history |
| u001 | aaa.mov | www.***a_f.mov | 1 | browse by end user exists. number of browse time by other users is two. |
| u001 | bbb.mov | www.***b_f.mov | 0 | — |
| ⋮ | ⋮ | ⋮ | ⋮ | ⋮ |

MOVING PICTURE/STILL PICTURE PROCESSING SYSTEM, SERVER, MOVING PICTURE/STILL PICTURE PROCESSING METHOD, AND PROGRAM

TECHNICAL FIELD

The present invention relates to techniques that decorate a user's moving picture or still picture as he or she prefers.

BACKGROUND ART

Many devices and services that serve to decorate moving pictures or still pictures have been provided. End users often use such devices and so forth when they exchange decorated moving pictures or the like so as to share their feelings between them. For example, a print seal device can take pictures with a camera, decorates taken pictures with frames or stamps, and prints the decorated pictures.

JP2003-92706A Publication (hereinafter referred to as Patent Literature 1) discloses a personal broadcasting system that is similar to a TV or radio broadcasting system. This system also decorates user's moving pictures or still pictures. The end user sets a broadcasting time for the system. At the broadcasting time that the end user has set for the system, a streaming delivery server decorates a moving picture or still picture transmitted from a user's terminal and delivers the decorated moving picture or still picture to client terminals live.

SUMMARY OF INVENTION

A print seal device is a large-scale device that is equipped with a camera, a printer, operation buttons, a display, and so forth. The end user needs to operate the print seal device to take pictures of persons including himself or herself and print decorated pictures. Thus, unless the end user goes to a place where a print seal device is installed, he or she cannot acquire decorated pictures. In other words, the end user cannot freely use a print seal device at his or her favorite place.

In contrast, with respect to the personal broadcasting system presented in Patent Literature 1, since an end user uses the system through a network, the degree of freedom for places that he or she can use the system is high. However, as described above, this system delivers content to multi end users at a preset time like a TV or radio broadcasting system, the end users cannot freely view decorated pictures at their favorite times.

An exemplary object of the invention is to provide a system that allows an end user to acquires decorated moving pictures or still pictures at his or her favorite place and time.

A moving picture/still picture processing system according to an exemplary aspect of the invention includes a server; and a communication terminal that communicates with the server through a network, wherein the communication terminal transmits to the server a request that causes the server to decorate a moving picture or still picture according to a designated decoration method, wherein when the server receives the request from the communication terminal, the server generates request identification information that identifies the request, stores the decoration method that is designated in the request and that is correlated with the request identification information, and transmits the request identification information to the communication terminal, wherein when the communication terminal receives the request identification information from the server, the communication terminal adds the request identification information to a moving picture or still picture and transmits the moving picture or still picture to the server, and wherein when the server receives the moving picture or still picture from the communication terminal, the server decorates the moving picture or still picture according to the decoration method corresponding to the request identification information added to the moving picture or still picture, stores the decorated moving picture or still picture, and delivers the decorated moving picture or still picture corresponding to a delivery request.

A server according to an exemplary aspect of the invention includes a reception section that receives from a communication terminal a request that causes a moving picture or still picture to be decorated according to a designated decoration method and also receives the moving picture or still picture that contains request identification information that identifies the request from the communication terminal; an order management section that generates the request identification information corresponding to the request received by the reception section; a storage section that stores the decoration method that is designated in the request received by the reception section and that is correlated with the request identification information generated by the order management section and also the moving picture or still picture decorated according to the decoration method; a decoration section that reads the decoration method corresponding to the request identification information added to the moving picture or still picture received by the reception section from the storage section, decorates the moving picture or still picture according to the decoration method, and stores the decorated moving picture or still picture to the storage section; and a delivery management section that reads the decorated moving picture or still picture from the storage section and delivers the decorated moving picture or still picture corresponding to a delivery request.

A moving picture/still picture processing method according to an exemplary aspect of the invention includes causing the communication terminal to transmit to a server that communicates with the communication terminal through a network a request that causes the server to decorate a moving picture or still picture according to a designated decoration method; causing the server to generate request identification information that identifies the request when the server receives the request from the communication terminal; causing the server to store the decoration method that is designated in the request and that is correlated with the request identification information; causing the server to transmit the request identification information to the communication terminal; causing the communication terminal to add the request identification information to a moving picture or still picture and transmits the moving picture or still picture to the server when the communication terminal receives the request identification information from the server; causing the server to decorate the moving picture or still picture according to the decoration method that corresponds to the request identification information added to the moving picture or still picture and store the decorated moving picture or still picture when the server receives the moving picture or still picture from the communication terminal; and causing the server to deliver the decorated moving picture or still picture corresponding to a delivery request.

A program according to an exemplary aspect of the invention causes a computer to execute procedures, comprising: a request reception procedure that receives from a communication terminal a request that causes a moving picture or still picture to be decorated according to a designated decoration method; a request identification information generation procedure that generates request identification information that identifies the request received at the request reception procedure; a procedure that stores the decoration method that is designated in the request received at the request reception procedure and that is correlated with the request identification information generated based on the request identification information generation procedure; a moving picture/still picture reception procedure that receives a moving picture or still picture that contains the request identification information from the communication terminal; a decoration procedure that reads a decoration method that corresponds to the request identification information contained in the moving picture or still picture received at the moving picture/still picture reception procedure from the storage section and decorates the moving picture or still picture according to the decoration method; a procedure that stores the moving picture or still picture decorated based on the decoration procedure in the storage section; and a delivery procedure that reads the decorated moving picture or still picture from the storage section and delivers the decorated moving picture or still picture corresponding to a delivery request.

BRIEF DESCRIPTION OF DRAWINGS

FIG. 6 is a schematic diagram showing an example of information stored in an effect program DB according to the first embodiment of the present invention.

FIG. 7 is a schematic diagram showing an example of information stored in a user DB according to the first embodiment of the present invention.

DESCRIPTION OF EMBODIMENTS

Figure 1:
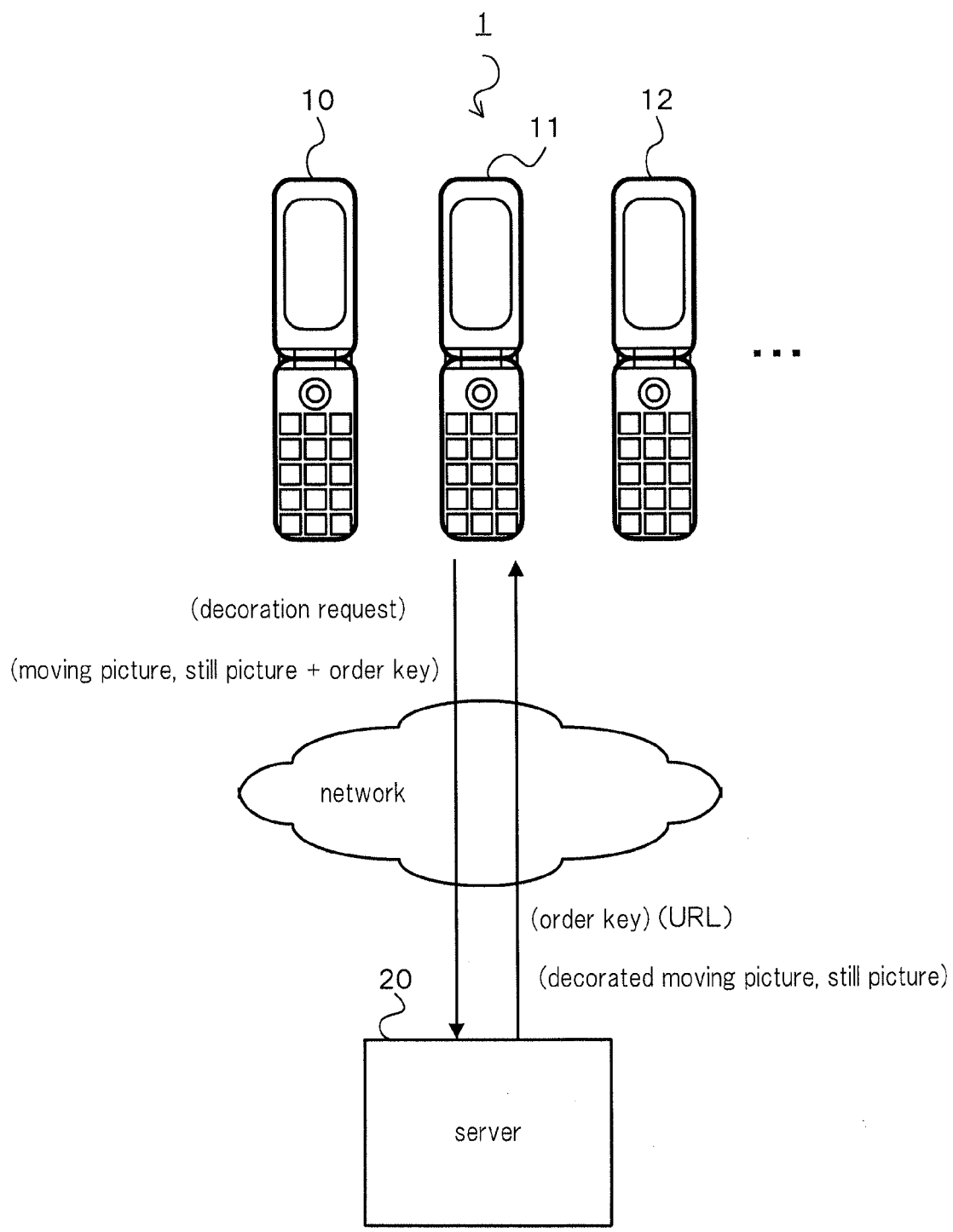
FIG. 1 is an example of an overall schematic diagram showing a moving picture/still picture processing system according to a first embodiment of the present invention.

Next, with reference to the accompanying drawings, a first embodiment of the present invention will be described. FIG. 1 is an example of an overall schematic diagram showing moving picture/still picture processing system 1 according to this embodiment. Moving picture/still picture processing system 1 is a system that provides a service that decorates a moving picture or still picture transmitted from an end user.

Moving picture/still picture processing system 1 has at least one user terminal (10, 11, and 12) and server 20. User terminal 10 and so forth and server 20 can radio-communicate with each other through a network.

User terminals 10 to 12 are mobile communication terminals such as mobile phones and have not only a radio communication function, but also a moving picture/still picture capturing function.

Server 20 is a server that receives an decoration order for a moving picture or still picture from an end user, decorates the moving picture or still picture corresponding to the received order, and provides the decorated moving picture or still picture to him or her. According to this embodiment, it is assumed that a service provider that provides a decorated moving picture or still picture manages and operates the site using server 20.

The structures of user terminals 10 to 12 are the same. In the following, an outline of a series of operations of the system will be exemplified by user terminal 10.

First, user terminal 10 accesses server 20, designates a decoration method for a moving picture or still picture as the end user desires, and transmits to server 20 a decoration request that causes it to decorate the moving picture or still picture according to the designated decoration method.

When server 20 receives the decoration request from user terminal 10, server 20 generates an order key that identifies the decoration request. Server 20 correlates the decoration method designated in the decoration request with the order key and transmits the order key to user terminal 10.

When user terminal 10 receives the order key, user terminal 10 adds the order key to a moving picture or still picture that the end user wants to decorate and transmits the moving picture or still picture along with the order key to server 20. According to this embodiment, user terminal 10 attaches the moving picture or still picture to electronic mail that has text of the order key and transmits the electronic mail with an attachment of the moving picture or still picture to server 20.

When server 20 receives the moving picture or still picture, server 20 decorates the moving picture or still picture according to the decoration method correlated with the order key added thereto and provides the decoded moving picture or still picture to user terminal 10. When server 20 provides a moving picture or still picture, server 20 decorates the moving picture or still picture, stores the decoded moving picture or still picture in a storage location of a predetermined site and notifies the user terminal of a URL that represents the address of the site that has the storage location that the end user can access through the network. The end user accesses the site represented by the URL using user terminal 10 or another communication terminal and thereby views or acquires the decorated moving picture or still picture.

It is assumed that if the user is the owner of the decorated moving picture or still picture, he or she is allowed not only to view the moving picture in the streaming format or browse the still picture on the display, but also to download data of the moving picture or still picture. In addition, it is assumed that although an end user who is not the owner of the decorated moving picture, is allowed to view the moving picture in the streaming format, or browse the still picture on the display, but is not allowed to download data of the moving picture or still picture.

Figure 2:
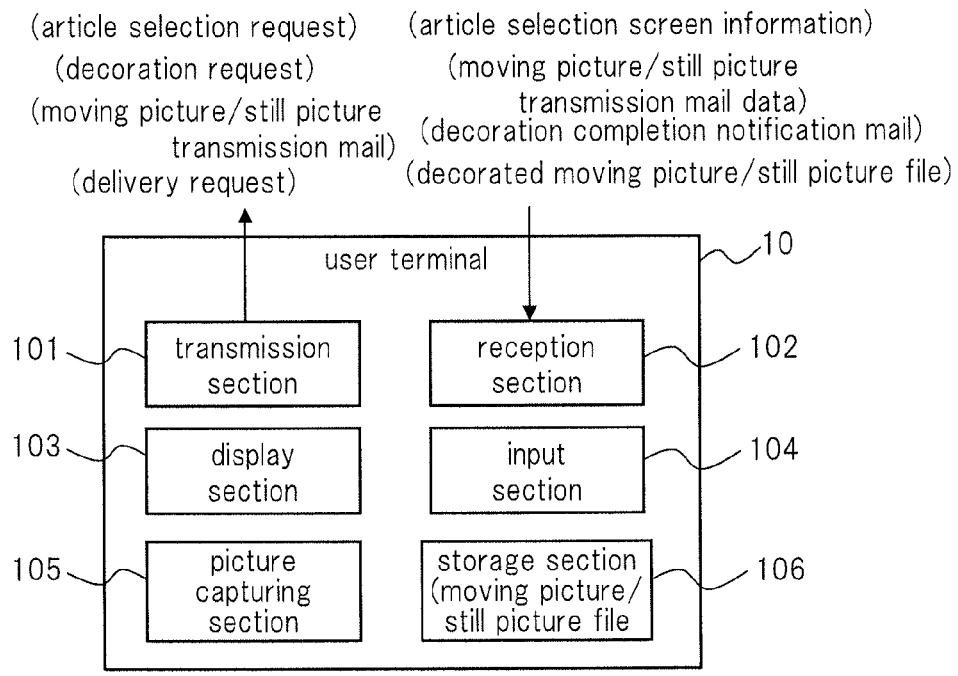
FIG. 2 is a block diagram showing an example of a structure of a user terminal according to the first embodiment of the present invention.

FIG. 2 is a block diagram showing an example of a structure of user terminal 10. Referring to the drawing, user terminal 10 has transmission section 101, reception section 102, display section 103, input section 104, picture capturing section 105, and storage section 106. The structure of each of user terminals 11, 12, and so forth is the same as the structure of user terminal 10.

Server 20 is a server that receives a decoration order for a moving picture or still picture from the end user and processes the received order. According to this embodiment, server 20 manages and operates an order site that receives a decoration order for a moving picture or still picture from the end user on line.

Figure 3:
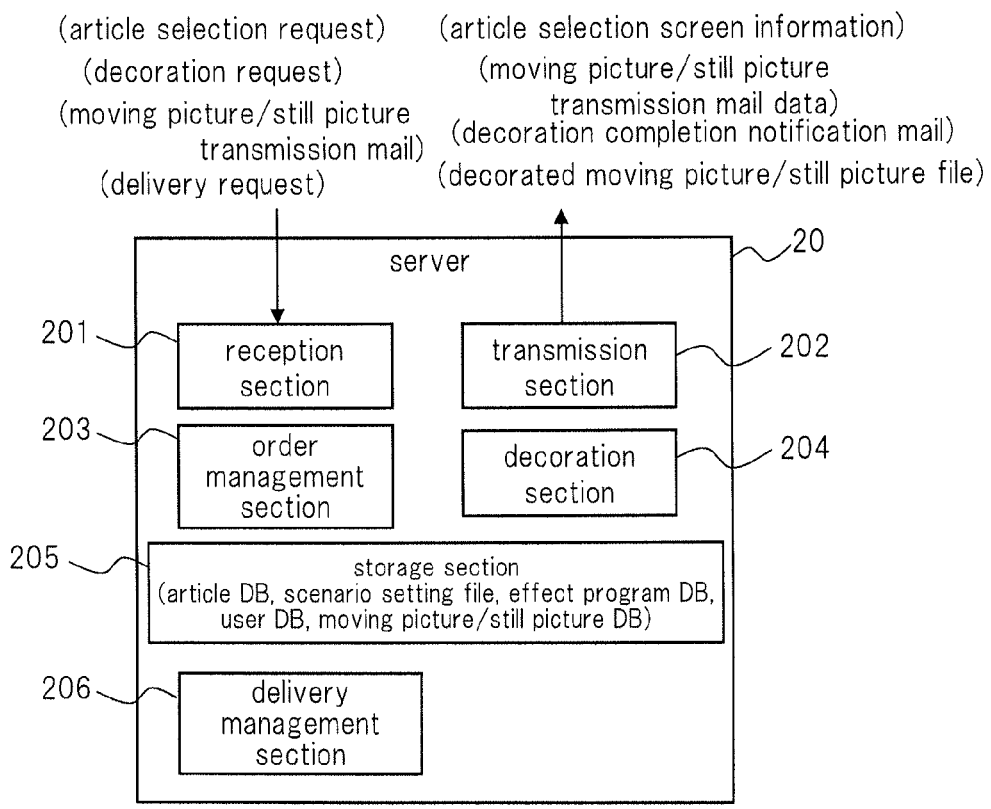
FIG. 3 is a block diagram showing an example of a structure of a server according to the first embodiment of the present invention.

FIG. 3 is a block diagram showing an example of the structure of server 20. Referring to the drawing, server 20 has reception section 201, transmission section 202, order management section 203, decoration section 204, storage section 205, and delivery management section 206.

Next, the structures of user terminal 10 and server 20 shown in FIG. 1 to FIG. 3 will be described in detail.

When the end user accesses the order site using user terminal 10, transmission section 101 transmits to server 20 an article selection request denoting that user terminal 10 will start selecting an article.

"Article" according to this embodiment is defined as a combination of "scenario" and data of a material used in the scenario. According to this embodiment, at least one article is defined. As material data, moving picture data, still picture data, or audio data are used.

"Scenario" is defined as a series of effects added to a moving picture or still picture. In addition, "scenario" is defined, for example, as at least one effect program and a data format in which each effect program processes data. Data that each effect program processes are moving picture data or still picture data to be decorated and material data to be added. The data format is defined for example as PNG (Portable Network Graphics), SWF (Shockware Flash), WAV (RIFF waveform Audio Format), JPEG (Joint Photographic Experts Group), MOV, or the like.

An effect program is a program that processes a moving picture or still picture in predetermined manner, for example, adds an effect thereto.

Examples of effects added to moving pictures or still pictures include adding a material such that the material is displayed at a designated position of a moving picture at a designated time or that the material is moved as an object of a moving picture moves, to stress or to echo a sound as an object of a moving picture moves, and to recognize a shape, a color, or a face such that a still picture is displayed at a predetermined position based on the recognized result, more specifically, to add a subtitle to a moving picture or to add a stamp to a still picture.

According to this embodiment, the time and position at which material data are added have been set for each effect program. If a program detects the motion of an object of a moving picture, the location and position at which material data are added are dynamically set for the program that corresponds to the position and time at which the object of the moving picture is moved. In addition, as described above, combinations of materials to be added and scenarios that identify effect programs have been defined for individual articles. Thus, the end user can easily and specifically designate the content of a decoration for an article without necessity of setting the type of a material to be added, a time and a position at which the material is added, and so forth.

Each article is assigned an article ID that identifies an article itself. Scenarios and materials defined for individual articles correlated with the articles ID of the articles have been stored in an article DB (Database) located in storage section 205 of server 20. Each effect program is assigned an effect identifier that identifies an effect program itself. An effect identifier of an effect program executed that corresponds to each scenario has been contained in a scenario setting file stored in storage section 205. An effect program corresponding to the effect identifier has been stored in an effect program DB located in storage section 205.

When reception section 201 of server 20 receives an article selection request, transmission section 202 of server 20 transmits to user terminal 10 article selection screen information that appears on an article selection screen based on a list of articles stored in the article DB. The article selection screen information includes article IDs corresponding to the listed articles.

The article selection screen is a screen that appears on user terminal 10 when the end user selects his or her desired article from the list of articles. The article selection screen may be transmitted as a plurality of screens. For example, if an article is grouped as a plurality of genres, after an article selection screen that shows a list of genres is transmitted, an article selection screen that shows a list of articles that belong to the genre is transmitted.

Display section 103 of user terminal 10 displays the article selection screen corresponding to the article selection screen information.

Input section 104 of user terminal 10 has an input interface such as buttons and/or a touch panel. When the end user selects an article, he or she enters information to input section 104 that represents the article that he or she has selected. When the end user has selected the article, input section 104 reads an article ID that corresponds to the selected article from the article selection screen information. Input section 104 outputs the article ID to transmission section 101.

Transmission section 101 of user terminal 10 transmits to server 20 a decoration request that causes server 20 to decorate a moving picture or still picture with the designated article. Added to this decoration request are the article ID of the designated article and the user ID that identifies the end user.

User terminal 10 and server 20 use, for example, a terminal ID assigned to each user terminal 10 as a user ID.

Reception section 201 of server 20 receives the decoration request. Whenever reception section 201 receives a decoration request, order management section 203 determines that an order has occurred and generates an order key that identifies each order.

According to this embodiment, a combination of a user ID, an article ID, and a time at which these IDs were processed is managed as one "order."

An order key is a key that serves to identify a moving picture or still picture corresponding to a decoration order received from the end user and to identify a decoration method designated by the end user for the moving picture or still picture.

Specifically, an order key is composed of a user ID, an article ID, and a time at which these IDs were processed. According to this embodiment, an order key is converted into a hash value so as to prevent the user ID from being leaked out of the system. In addition, according to this embodiment, it is assumed that the time at which an ID was processed is the time at which order management server 20 received the ID.

For example, order management section 203 of server 20 combines a user ID, an article ID, and a character string that represents the time at which they were processed to generate an order key. Order management section 203 converts the order key into a hash value and transmits the hashed order key to the user terminal.

Order management section 203 of server 20 correlatively stores the generated order key, the hashed order key, and the content of the order to the user DB of storage section 205.

Order management section 203 of server 20 outputs moving picture/still picture transmission mail data containing the destination of the moving picture or still picture and the hashed order key to transmission section 202. Transmission section 202 transmits the moving picture/still picture transmission mail data to user terminal 10.

In this context, the moving picture/still picture transmission mail data contains text of the moving picture/still picture transmission mail and information that represents the mail address of the destination of the moving picture or still picture. According to this embodiment, tags that cause user terminal 10 to display the mail address and the text on the user terminal are placed before and after them. In addition, a tag that designates a link destination as a mailer or that causes a mailer to start up is followed by the mail address. The moving picture/still picture transmission mail is mail to which user terminal 10 attaches a moving picture or still picture and that is transmitted from user terminal 10 to server 20.

Reception section 102 of user terminal 10 receives the moving picture/still picture transmission mail data from server 20. Display section 103 displays moving picture/still picture transmission mail that contains text of the moving picture/still picture transmission mail data. The end user attaches a moving picture or still picture (moving picture/still picture file or still picture file) to be decorated to the moving picture/still picture transmission mail in such a manner that he or she inputs information that designates the storage location of the moving picture/still picture file to be attached to input section 104. The moving picture/still picture file is a file that records moving picture data or still picture data. Of course, moving picture data may contain audio data.

Picture capturing section 105 of user terminal 10 can capture a moving picture or still picture using a camera, its control program, and so forth. Picture capturing section 105 stores the captured and generated moving picture/still picture file in storage section 106.

The end user selects a moving picture/still picture file to be attached to moving picture/still picture transmission mail from those stored in storage section 106.

If the end user needs to input characters as the content of a material, for example, a subtitle or a character stamp, he or she inputs characters to be added to the subject field or the text field of the moving picture/still picture transmission mail.

Transmission section 101 of user terminal 10 transmits the moving picture/still picture transmission mail with an attachment of the moving picture/still picture file to server 20.

Reception section 201 of server 20 receives the moving picture/still picture transmission mail. Order management section 203 correlatively stores the order key contained in the moving picture/still picture transmission mail and the moving picture/still picture file attached to the moving picture/still picture transmission mail in the moving picture/still picture DB of storage section 205.

Thereafter, order management section 203 of server 20 reads an user ID and an article ID that corresponds to the received order key from the user DB. Order management section 203 outputs the user ID, the article ID, and the moving picture/still picture file attached to the moving picture/still picture transmission mail to decoration section 204.

Decoration section 204 reads a scenario and a material corresponding to the article ID from the article DB. Thereafter, decoration section 204 reads an effect identifier of an effect program used for the scenario from the scenario setting file and then reads an effect program corresponding to the effect identifier from the effect program DB.

Decoration section 204 adds the material to the attached moving picture/still picture file according to the effect program that has been read so as to decorate the moving picture or still picture. Decoration section 204 generates a decorated moving picture/still picture file that records the decorated moving picture data or still picture data. Decoration section 204 stores the decorated moving picture/still picture file in the predetermined storage location of storage section 205 and also correlatively stores a URL (Uniform Resource Locator) that represents the storage location of the decorated moving picture/still picture file and the user ID in the moving picture/still picture DB. Decoration section 204 notifies order management section 203 of the completion of the decoration process.

When order management section 203 is notified of the completion of the decoration process, it generates decoration completion notification mail that contains the URL and text that represents the completion of the decoration process and outputs the decoration completion notification mail to transmission section 202. Transmission section 202 transmits the decoration completion notification mail to user terminal 10.

Reception section 102 of user terminal 10 receives the decoration completion notification mail. Display section 103 displays the content of the decoration completion notification mail. The end user of user terminal 10 can forward the decoration completion notification mail or copy the URL contained in the decoration completion notification mail and transmit the URL to user terminals that his or her friends have.

Input section 104 of the user terminal allows the end user to perform an operation that accesses the URL contained in the decoration completion notification mail. When the end user performs the operation that accesses the URL, input section 104 outputs the URL to transmission section 101. Transmission section 101 transmits a delivery request that contains the user ID to the address of the URL. The delivery request is a request message that causes a moving picture or still picture stored in the URL to be transmitted to user terminal 10.

Reception section 201 of server 20 receives the delivery request. When reception section 201 receives the delivery request, delivery management section 206 reads a user ID that corresponds to the URL designated by the delivery request from the moving picture/still picture DB. Delivery management section 206 determines whether or not the user ID read from the moving picture/still picture DB matches the user ID that was added to the delivery request.

If they match, delivery management section 206 determines that the end user who is the sender of the delivery request is the end user himself or herself who has made the decoration order for the moving picture or still picture. In this case, delivery management section 206 transmits the decorated moving picture/still picture file stored in the URL to user terminal 10 through transmission section 202 in a format that user terminal 10 can reproduce and save the file.

If these user IDs do not match, delivery management section 206 determines that the end user who is the sender of the delivery request is not the end user himself or herself who has made the decoration order for the moving picture or still picture. In this case, delivery management section 206 transmits the decorated moving picture/still picture file stored in the URL to user terminal 10 through transmission section 202 in the streaming format that user terminal 10 can reproduce the decorated moving picture/still picture file, but not save it.

After delivery management section 206 transmits the decorated moving picture/still picture file, delivery management section 206 records a history such as the number of times and dates and times that the end users viewed a moving picture or still picture in the moving picture/still picture DB.

Next, with reference to FIG. 4 to FIG. 8, information stored in the article DB, the scenario setting file, the effect program DB, the user DB, and the moving picture/still picture DB located in storage section 205 of server 20 will be described.

Figure 4:
FIG. 4 is a schematic diagram showing an example of information stored in an article DB according to the first embodiment of the present invention.

FIG. 4 is a schematic diagram showing an example of information stored in the article DB. Referring to the drawing, the article DB stores information that represents "decoration article name," "scenario identifier," data of "material," and data of "sample moving picture" correlated with "article ID."

"Article ID" is an identifier that identifies an article. "Decoration article name" is the name of an article identified by "article ID." "Scenario identifier" is an identifier that identifies a scenario used for an article corresponding to "article ID." Data of "material" are moving picture data or still picture data added as a material in an article corresponding to "article ID." Data of "sample moving picture" is a sample of moving picture data or still picture data decorated by the article corresponding to the article ID.

As described above, an article is defined by a combination of a scenario and a material. For example, the name of an article whose article ID is "s001" is "article A." Defined for article A are a scenario corresponding to scenario identifier "scenario P" and two materials "001.png" and "002.png" corresponding to effects contained in the scenario.

Figure 5:
FIG. 5 is a schematic diagram showing an example of information stored in a scenario setting file according to the first embodiment of the present invention.

FIG. 5 is a schematic diagram showing an example of information stored in the scenario setting file. Referring to the drawing, the scenario setting file stores at least one "effect identifier" correlated with "scenario identifier." "Effect identifier" is an identifier that identifies an effect program used for a scenario corresponding to "scenario identifier."

For example, if two effect programs corresponding to effect identifiers "effect X" and "effect Y" are executed in a scenario corresponding to scenario identifier "scenario P," "effect X" and "effect Y" corresponding to "scenario P" are stored.

FIG. 6 is a schematic diagram showing an example of information stored in the effect program DB. Referring to the drawing, the effect program DB stores "effect program" and information that represents "remarks" corresponding to "effect identifier." "Remarks" represents the content of an effect added to a moving picture or still picture. Since one effect program can add a plurality of effects to a moving picture or still picture, a plurality of effect identifiers may be correlated with one effect program.

Since information that represents "remarks" is information displayed when the supervisor of server 20 wants to know the content of an effect program, it may not be stored in the effect program DB if not necessary.

FIG. 7 is a schematic diagram showing an example of information stored in the user DB. Referring to the drawing, the user DB stores information that represents "content of order" correlated with "order key."

Stored as "order key" are "plain order key" and "hashed order key." Stored as information that represents "content of order" are "user ID," "article ID," and "order date and time."

"Plain order key" is an order key that has not been converted into a hash value. "Hashed order key" is an order key that has converted into a hashed value. "Order date and time" are the date and time on and at which server 20 received and processed an article ID and a user ID.

For example, it is assumed that the user whose user ID is "u001" ordered an article whose article ID is "s001" on Sep. 17, 2009. Server 20 generates a character string "u001s00120090917" in which these user ID, article ID, and order date and time are connected as "plain order key." Thereafter, server 20 converts this character string into a hash value and thereby generates ten-digit random unique alphanumeric characters "0bz9c7fqa4" as "hashed order key." Server 20 stores user ID "u001," article ID "s001," and order date and time "2009/9/17" correlated with the generated order key "u001s00120090917" and the hashed order key "0bz9c7fqa4" to the user DB.

Figure 8:
FIG. 8 is a schematic diagram showing an example of information stored in a moving picture/still picture DB according to the first embodiment of the present invention.

FIG. 8 is a schematic diagram showing an example of information stored in the moving picture/still picture DB. Referring to the drawing, the moving picture/still picture DB stores "received moving picture/still picture," "URL," and information that represents "browse history" correlated with "user ID."

"Received moving picture/still picture" is the name of a moving picture/still picture file received from a user terminal that belongs to an end user identified by "user ID." "URL" is a URL that represents the storage location of a decorated moving picture/still picture file. According to this embodiment, the URL that represents the storage location of the decorated moving picture/still picture file stored in storage section 205 is registered.

"Browse history" is a history that records the number of times the end user viewed a received moving picture/still picture, data that denote that the viewer is the end user himself or herself who made a decoration order, and so forth.

The browse history is stored in the moving picture/still picture DB such that the end user and a content provider that will be described later can browse data that corresponds to a decorated moving picture/still picture file, a user, an article, and a scenario.

Figure 9:
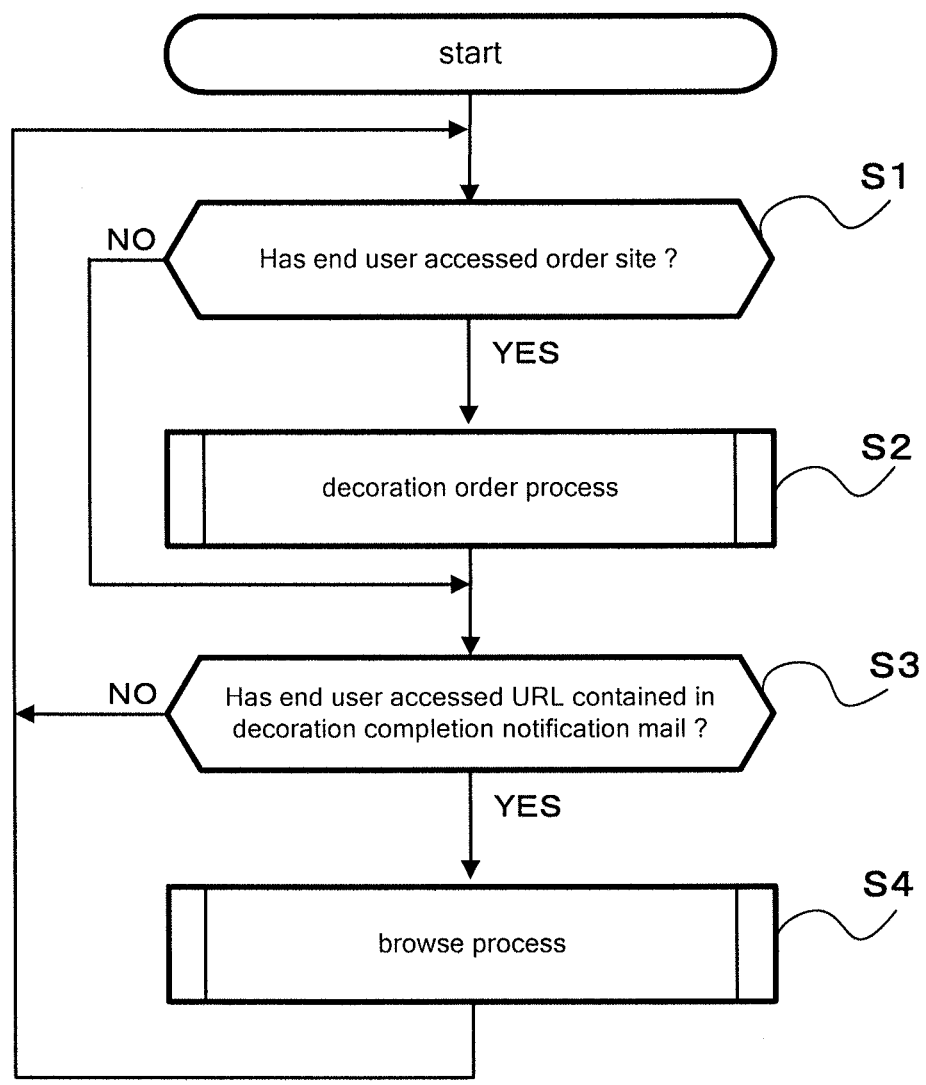
FIG. 9 is a flow chart showing an operation of the user terminal according to the first embodiment of the present invention.

Next, with reference to FIG. 9 to FIG. 15, the operation of the moving picture/still picture processing system will be described. FIG. 9 is a flow chart showing the operation of user terminal 10. When the power of user terminal 10 is turned on, user terminal 10 starts operating. The operation of each of other user terminals such as user terminals 11 and 12 is the same as the operation of user terminal 10.

Referring to FIG. 9, user terminal 10 determines whether or not the end user has performed an operation that accesses an order site (at step S1). If the end user has performed the operation that accesses the order site (YES at step S1), user terminal 10 executes a decoration order process that implements a decoration order with server 20 for a moving picture or still picture (at step S2).

If the end user has not performed the operation that accesses the order site (NO at step S1) or after step S2 is executed, user terminal 10 determines whether or not the end user has performed the operation that accesses a URL contained in decoration completion notification mail (at step S3). If the end user has performed the operation that accesses a URL (YES at step S3), user terminal 10 executes a browse process that requests server 20 to transmit a decorated moving picture or still picture (at step S4).

If the end user has not performed the operation that accesses a URL (NO at step S3) or after step S4 is executed, user terminal 10 returns to step S1.

Figure 10:
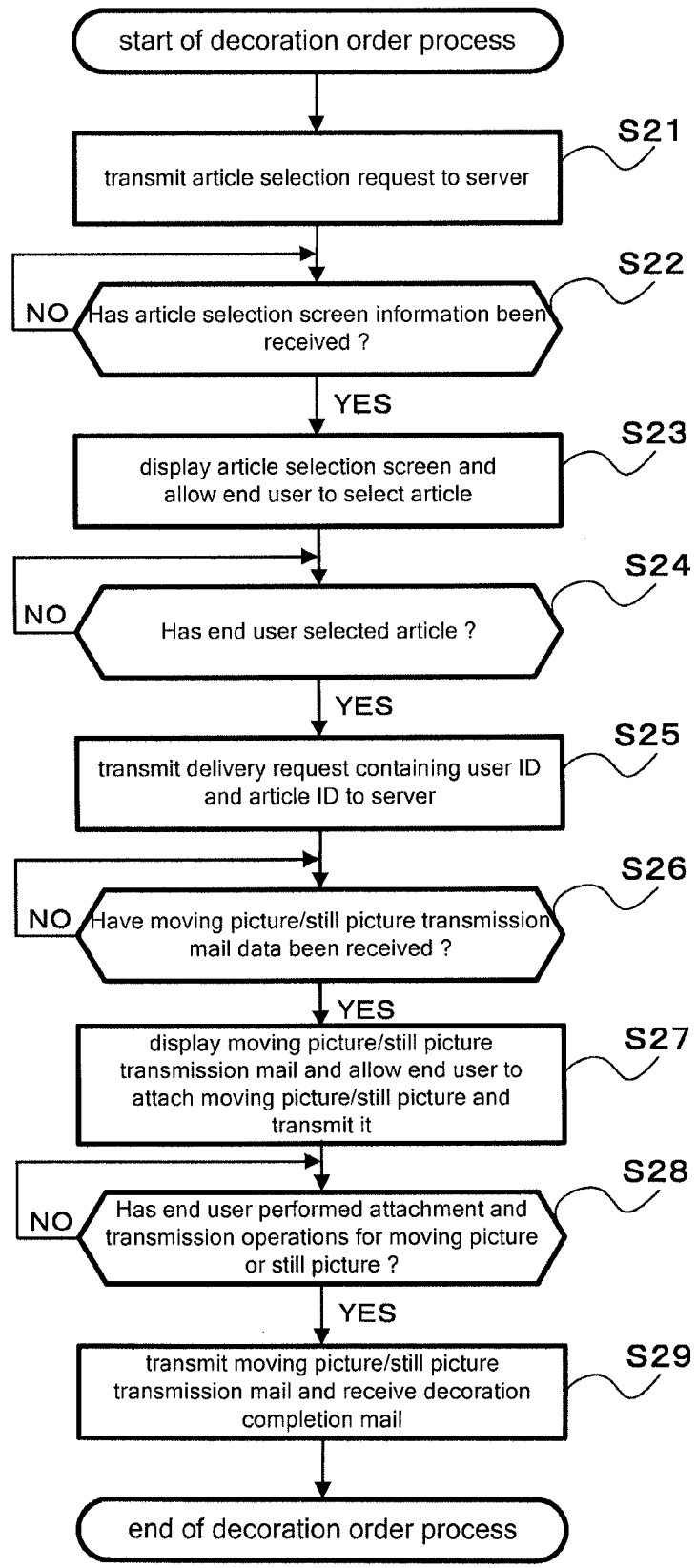
FIG. 10 is a flow chart showing a decoration order process according to the first embodiment of the present invention.

FIG. 10 is a flow chart showing the decoration order process. Referring to the drawing, user terminal 10 transmits an article selection request to server 20 (at step S21). Server 20 transmits article selection screen information corresponding to the article selection request to user terminal 10.

User terminal 10 determines whether or not it has received the article selection screen information from server 20 (at step S22). Unless user terminal 10 has received the article selection screen information (NO at step S22), user terminal 10 returns to step S22.

If user terminal 10 has received the article selection screen information from server 20 (YES at step S22), user terminal 10 displays an article selection screen corresponding to the article selection screen information and allows the end user to perform an operation that selects an article (at step S23).

User terminal 10 determines whether or not the end user has performed the operation that selects an article (at step S24). Unless the end user has selected an article (NO at step S24), user terminal 10 returns to step S24.

If the end user has performed the operation that selects an article (YES at step S24), user terminal 10 transmits a decoration request that contains the user ID of the end user and the article ID of the selected article to server 20 (at step S25). Server 20 generates an order key that corresponds to the user ID, the article ID, and the date and time and transmits moving picture/still picture transmission mail data that contain the order key to the user terminal.

User terminal 10 determines whether or not it has received the moving picture/still picture transmission mail data from server 20 (at step S26). Unless user terminal 10 has received the moving picture/still picture transmission mail data from server 20 (NO at step S26), user terminal 10 returns to step S26.

If user terminal 10 has received the moving picture/still picture transmission mail data (YES at step S26), user terminal 10 analyzes a tag contained in the moving picture/still picture transmission mail data and causes the tag to start up a mailer so as to generate and display moving picture/still picture transmission mail that corresponds to a destination mail address and text contained in the moving picture/still picture transmission mail data. Thereafter, user terminal 10 allows the end user to perform an attachment for a moving picture or still picture and the transmission operation for the moving picture or still picture (at step S27).

User terminal 10 determines whether or not the end user has performed the attachment operation for the moving picture or the like and the transmission operation for the moving picture or still picture (at step S28). Unless the end user has performed the attachment operation and the transmission operation (NO at step S28), user terminal 10 returns to step S28.

If the end user has performed the attachment operation for the moving picture or still picture and the transmission operation for the moving picture or still picture (YES at step S28), user terminal 10 transmits the moving picture/still picture transmission mail. Server 20 decorates the moving picture or still picture attached to the moving picture/still picture transmission mail and transmits decoration completion notification mail that contains a URL that represents the storage location of the decorated moving picture to the user terminal. Thereafter, user terminal 10 receives the decoration completion notification mail and displays it (at step S29). After step S29, user terminal 10 completes the decoration order process.

Figure 11:
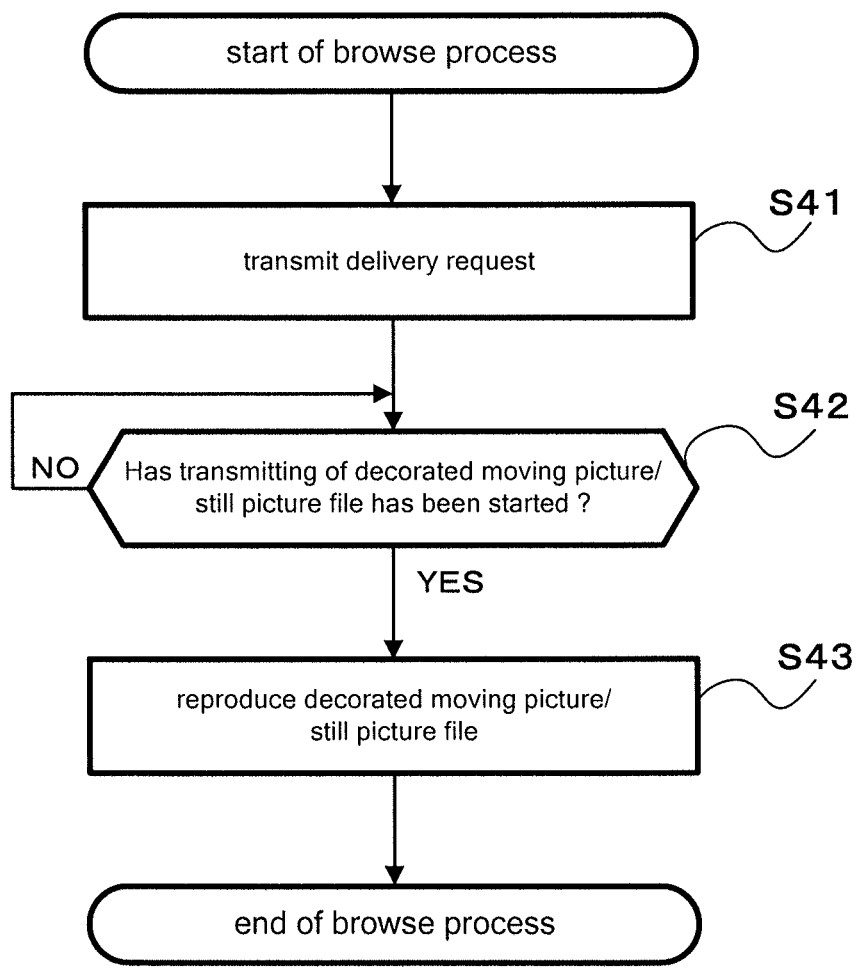
FIG. 11 is a flow chart showing a browse process according to the first embodiment of the present invention.

FIG. 11 is a flow chart showing a browse process. Referring to the drawing, user terminal 10 transmits a delivery request that contains the user ID to the address of the URL contained in the decoration completion notification mail (at step S41). Server 20 that manages the URL reads a decorated moving picture/still picture file from the URL that corresponds to the delivery request and transmits the decorated moving picture/still picture file to user terminal 10.

User terminal 10 determines whether or not server 20 has started transmitting the decorated moving picture/still picture file (at step S42). Unless server 20 has started transmitting the decorated moving picture/still picture file (NO at step S42), user terminal 10 returns to step S42.

If server 20 has started transmitting the decorated moving picture/still picture file (YES at step S42), user terminal 10 reproduces the decorated moving picture/still picture file that has been transmitted (at step S43). After step S43, the user terminal completes the browse process.

Figure 12:
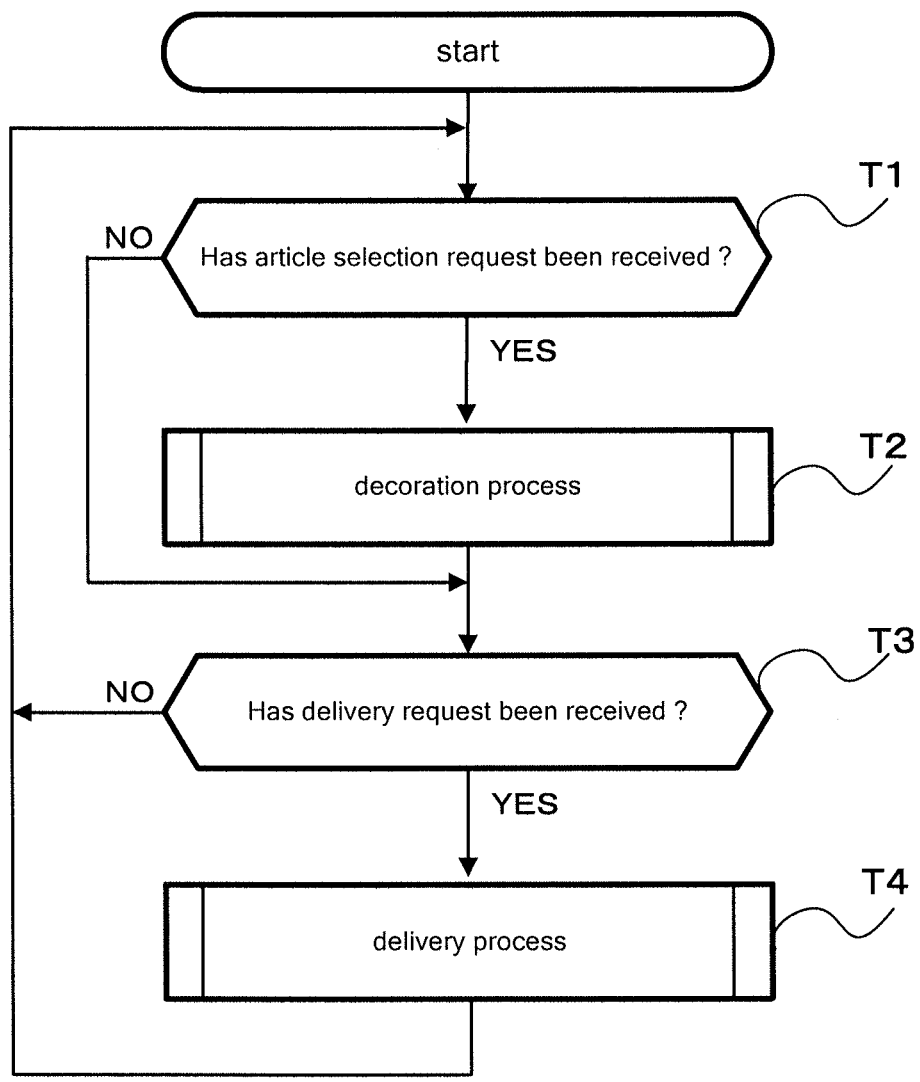
FIG. 12 is a flow chart showing an operation of a server according to the first embodiment of the present invention.

FIG. 12 is a flow chart showing the operation of server 20. When the power of server 20 is turned on, server 20 starts operating. Referring to the drawing, server 20 determines whether or not it has received the article selection request from the user terminal (at step T1). If server 20 has received the article selection request (YES at step T1), server 20 executes the decoration process that decodes a moving picture or still picture (at step T2).

Unless server 20 has received the article selection request (NO at step T1) or after step T2 is executed, server 20 determines whether or not it has received the delivery request from the user terminal (at step T3). If server 20 has received the delivery request (YES at step T3), server 20 executes a delivery process that delivers the decorated moving picture or still picture (at step T4).

Unless server 20 has received the delivery request (NO at step T3) or after step T4 is executed, server 20 returns to step T1.

Figure 13:
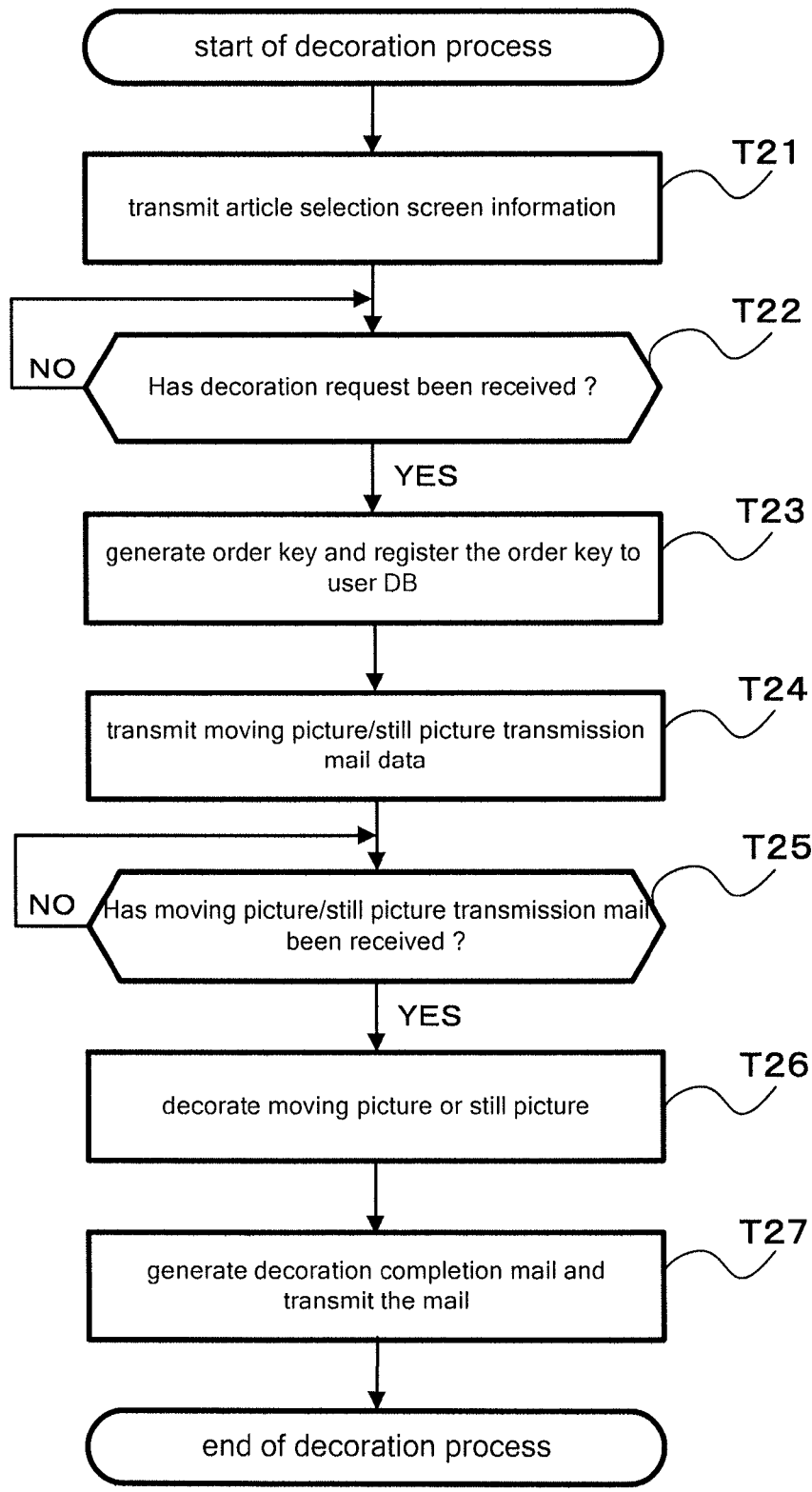
FIG. 13 is a flow chart showing a decoration process according to the first embodiment of the present invention.

FIG. 13 is a flow chart showing the decoration process. Referring to the drawing, server 20 transmits article selection screen information to the user terminal that has transmitted the delivery request (at step T21). The user terminal displays an article selection screen and transmits a decoration request that contains a user ID and an article ID to server 20 by the operation of the end user.

Server 20 determines whether or not it has received the decoration request from the user terminal (at step T22). Unless server 20 has received the decoration request (NO at step T22), server 20 returns to step T22.

If server 20 has received the delivery request (YES at step T22), server 20 generates an order key corresponding to the user ID and the article ID contained in the decoration request and the date and time on and at which the reception process was performed and registers the order key to the user DB (at step T23). Server 20 transmits moving picture/still picture transmission mail data that contain the order key to the user terminal (at step T24). The user terminal attaches the moving picture/still picture file to the moving picture/still picture transmission mail that contains text of the moving picture/still picture transmission mail data and transmits the moving picture/still picture transmission mail to server 20 by the operation of the end user.

Server 20 determines whether or not it has received the moving picture/still picture transmission mail from the user terminal (at step T25). Unless server 20 has received the moving picture/still picture transmission mail (NO at step S25), server 20 returns to step T25.

If server 20 has received the moving picture/still picture transmission mail (YES at step T25), server 20 reads the user ID and the article ID corresponding to the order key contained in the moving picture/still picture transmission mail from the user DB. Server 20 authenticates the user based on the user ID. In addition, server 20 decorates the moving picture or still picture attached to the moving picture/still picture transmission mail with a scenario and a material corresponding to the article ID and generates a decorated moving picture/still picture file (at step T26).

Server 20 adds a URL that represents the storage location of the decorated moving picture/still picture file to the decoration completion notification mail and transmits the mail to the user terminal (at step T27). After step T27, server 20 completes the decoration process.

Figure 14:
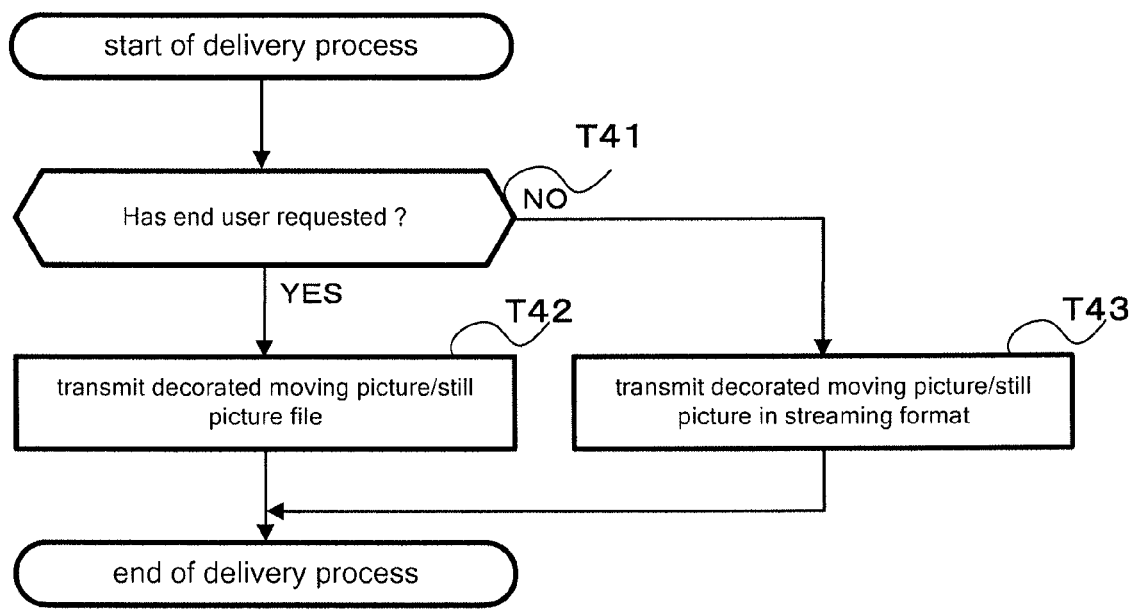
FIG. 14 is a flow chart showing a delivery process according to the first embodiment of the present invention.

FIG. 14 is a flow chart that shows a delivery process. Referring to the drawing, server 20 determines whether or not the end user who has issued the delivery request is the end user himself or herself who has made the decoration order based on the user ID that was added to the delivery request (at step T41).

If the end user who has issued the delivery request is the end user himself or herself who has made the decoration order (YES at step T41), server 20 transmits the decorated moving picture/still picture file stored in the URL to the user terminal in a format that the user terminal can reproduce and save the file (at step T42).

Unless the end user who has issued the delivery request is the end user himself or herself who has made the decoration order (NO at step T41), server 20 transmits the decorated moving picture/still picture file stored in the URL to the user terminal in streaming format (at step T43). After step T42 or T43, server 20 completes the delivery process.

Figure 15:
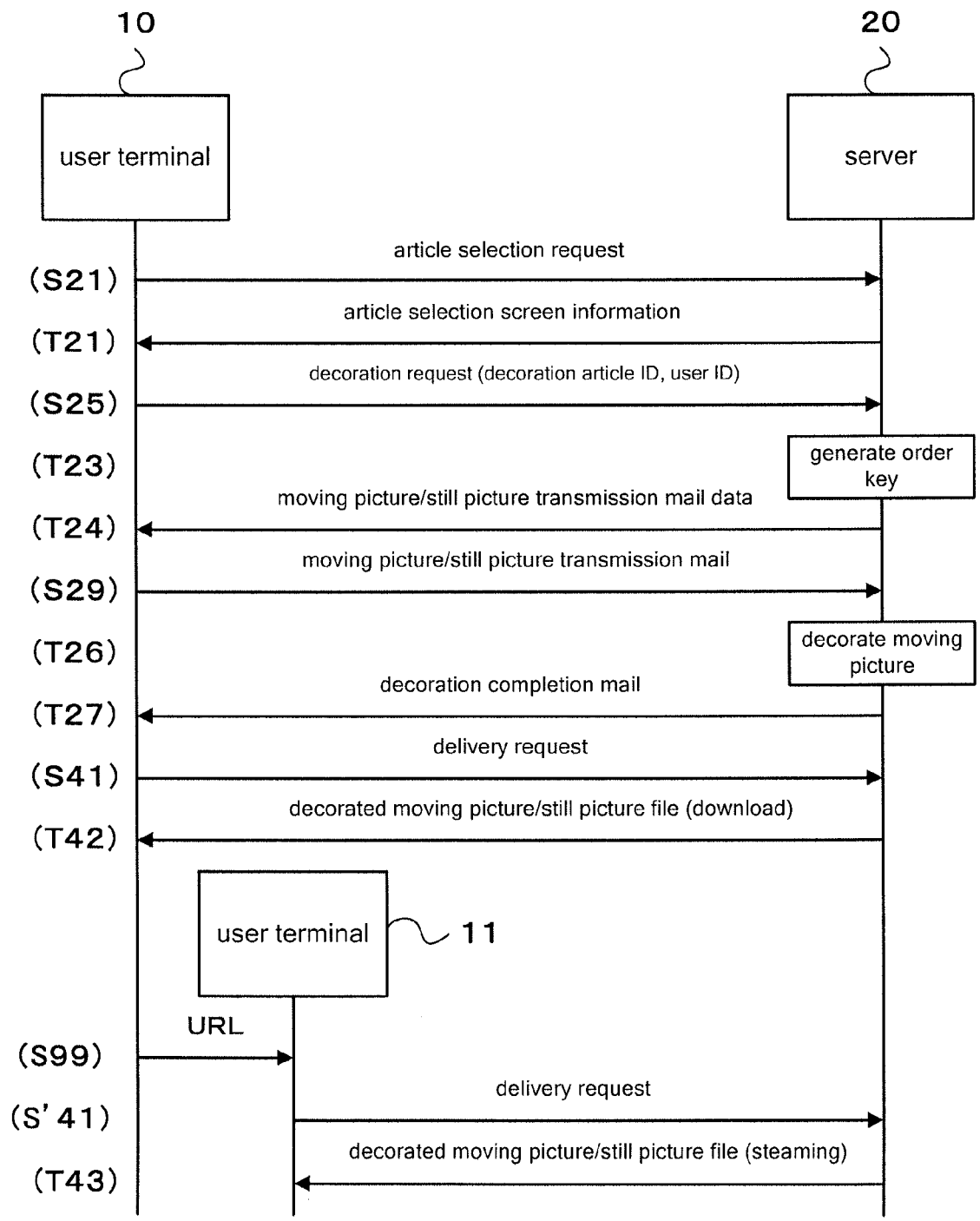
FIG. 15 is a sequence diagram showing an example of an operation of a moving picture/still picture processing system according to the first embodiment of the present invention

FIG. 15 is a sequence diagram showing an example of an overall operation of moving picture/still picture processing system 1. It is assumed that user terminal 10 makes a decoration order for a moving picture or still picture.

When the end user accesses the order site using user terminal 10, it transmits an article selection request to server 20 (at step S21). Thereafter, server 20 transmits article selection screen information to user terminal 10 that corresponds to the article selection request (at step T21). Thereafter, user terminal 10 displays an article selection screen and transmits a decoration request that contains a user ID and an article ID to server 20 by the operation of the end user (at step S25).

Server 20 generates an order key corresponding to the user ID, the article ID, and the received date and time (at step T23). Thereafter, server 20 transmits moving picture/still picture transmission mail data that contains the order key to user terminal 10 (at step T24).

User terminal 10 attaches a moving picture/still picture file to a moving picture/still picture transmission mail that contains text of the moving picture/still picture transmission mail data and transmits the moving picture/still picture transmission mail to server 20 by the operation of the end user (at step S29).

Server 20 acquires the user ID and the article ID that corresponds to the order key contained in the moving picture/still picture transmission mail. Thereafter, server 20 authenticates the user based on the user ID. In addition, server 20 decorates the moving picture/still picture file with a scenario and a material corresponding to the article ID (at step T26). Server 20 transmits decoration completion notification mail that contains a URL that represents the storage location of the decorated moving picture/still picture file to user terminal 10 (at step T27).

When the end user accesses the URL using user terminal 10, it transmits a delivery request that contains the user ID to server 20 (at step S41).

Server 20 determines that the user who has accessed the URL is the end user himself or herself who has made the decoration order that corresponds to the user ID contained in the delivery request. Server 20 transmits the decorated moving picture/still picture file to user terminal 10 in a format that user terminal 10 can reproduce and save the decorated moving picture (at step T42).

User terminal 10 copies the URL contained in the decoration completion notification mail and transmits the copied URL to user terminal 11 by the operation of the end user (at step S99).

When the end user accesses the URL using user terminal 11, it transmits a delivery request that contains the user ID to server 20 (at step S'41).

Server 20 determines that the user who has accessed the URL is not the end user himself or herself who has made the decoration order that corresponds to the user ID contained in the delivery request. Thereafter, server 20 transmits the decorated moving picture/still picture file to user terminal 11 in a streaming format (at step T43).

Next, with reference to FIG. 16 to FIG. 20, examples of pictures displayed on user terminal 10 or the like will be described.

Figure 16:
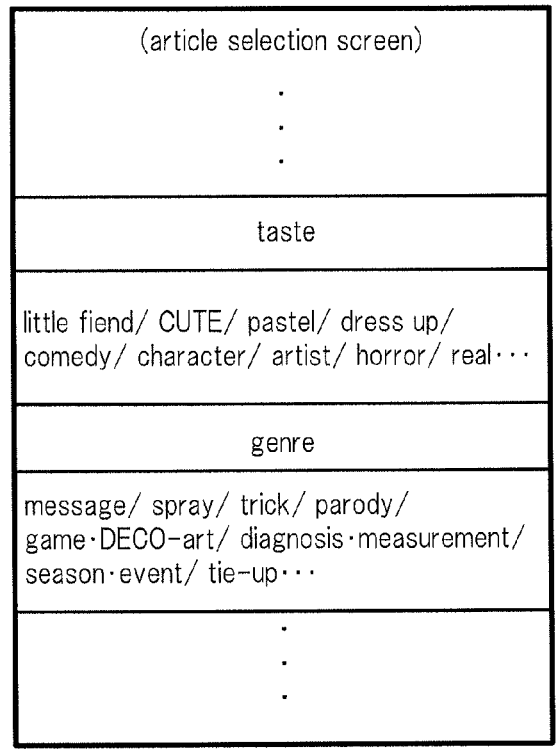
FIG. 16 is an example of an article selection screen according to the first embodiment of the present invention.
Figure 17:
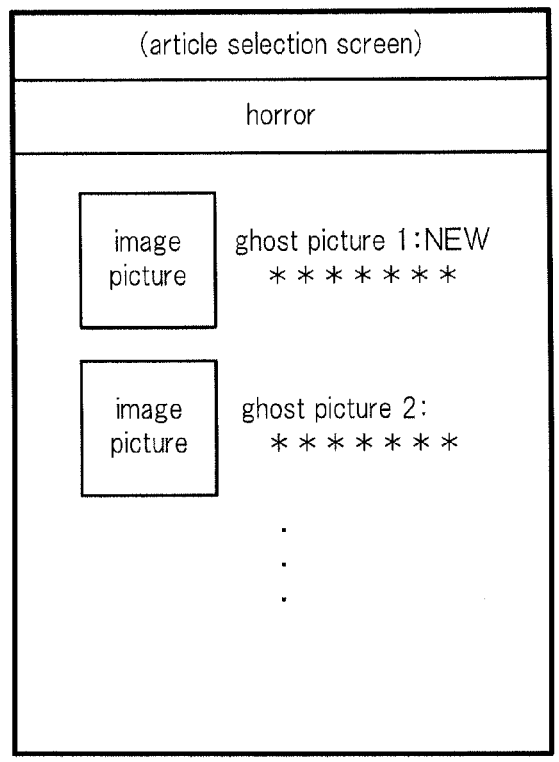
FIG. 17 is an example of the article selection screen according to the first embodiment of the present invention.
Figure 18:
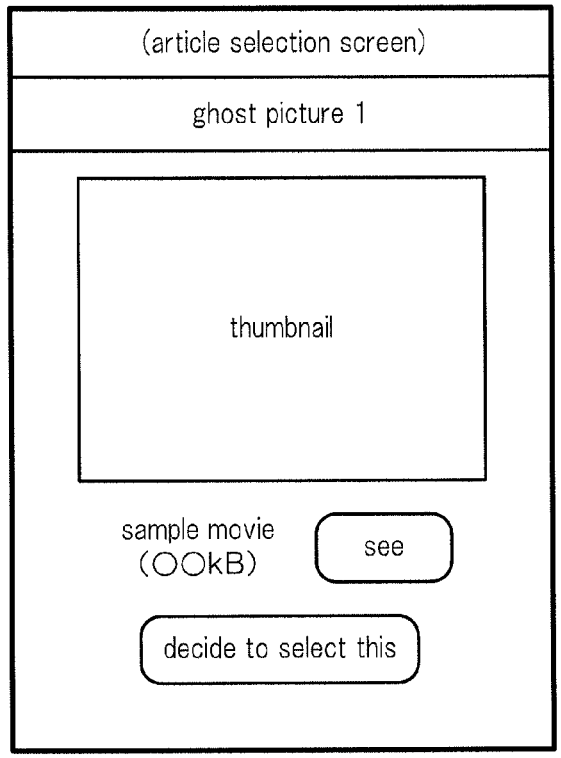
FIG. 18 is an example of the article selection screen according to the first embodiment of the present invention.

FIG. 16 to FIG. 18 are examples of the article selection screen displayed on the user terminal. According to this embodiment, articles are classified into a plurality of groups ("message," "spray," and so forth) that belong to categories such as "taste," "genre," and so forth. The user terminal displays the article selection screen that shows a list of groups.

When the end user selects any one of groups, the user terminal displays the article selection screen that shows a list of articles that belong to the selected group and brief remarks about their articles as shown in FIG. 17.

When the end user selects any article on the screen shown in FIG. 17, the user terminal displays the article selection screen that allows the end user to confirm the selected article as shown in FIG. 18. As shown in the drawing, the end user can view a sample moving picture/still picture file on the article selection screen. When the end user performs an operation that confirms the selected article, the user terminal transmits a decoration request that contains the article ID of the selected article and the user ID to server 20.

Figure 19:
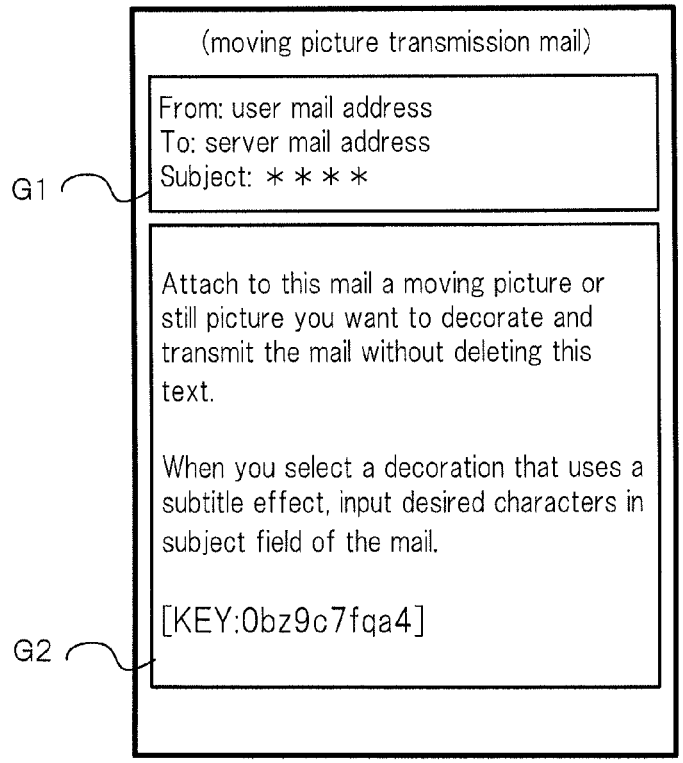
FIG. 19 is a schematic diagram showing an example of the content of moving picture/still picture transmission mail according to the first embodiment of the present invention.

FIG. 19 is a schematic diagram showing an example of the content of the moving picture/still picture transmission mail. The moving picture/still picture transmission mail contains text that reads for example "Attach to this mail a moving picture you want to decorate" as text of the moving picture/still picture transmission mail data received from server 20. The text of the moving picture/still picture transmission mail data contains a hashed order key (G2). When the end user designates the content of a subtitle, character information that represents the content of the subtitle is input to a subject (G1) field of the moving picture/still picture transmission mail.

Figure 20:
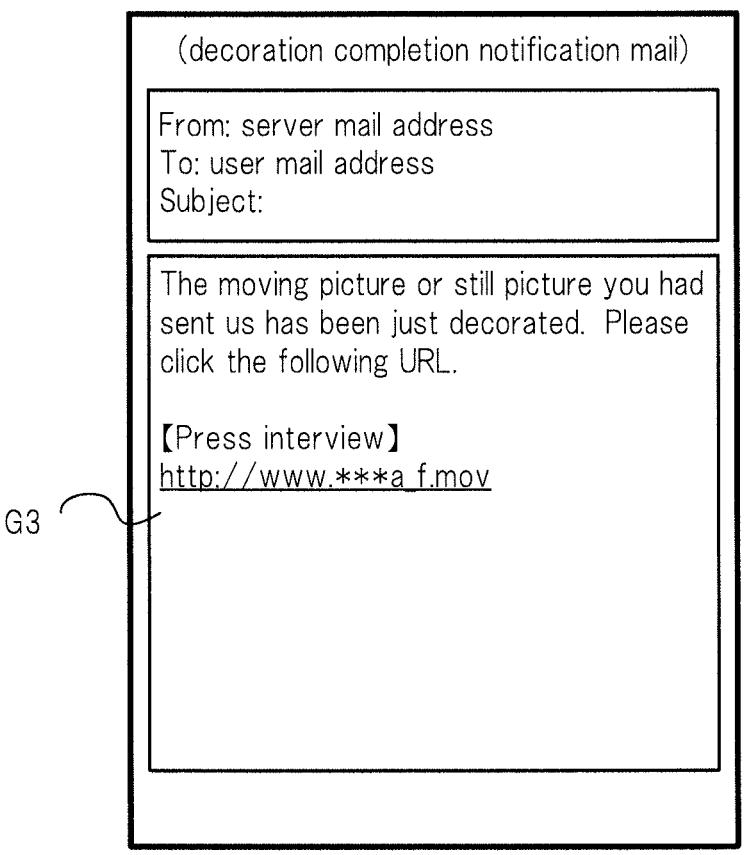
FIG. 20 is a schematic diagram showing an example of the content of decoration completion notification mail according to the first embodiment of the present invention.

FIG. 20 is a schematic diagram showing an example of the content of the decoration completion notification mail. As shown in the drawing, the decoration completion notification mail contains a URL (G3) that represents the storage location of the decoration moving picture/still picture file.

According to this embodiment, server 20 transmits a hashed order key. If a high security level is not required, server 20 may transmit a plain order key, not a hashed order key.

In addition, according to this embodiment, although server 20 encrypts the order key with a hash function, server 20 may use a non-hash function as long as it is a one-directional function that is difficult to be reversely converted.

According to this embodiment, sample moving pictures are stored in the article DB. If sample moving pictures do not need to be reproduced on the user terminal, they may not be stored in the article DB.

According to this embodiment, a browse history is recorded in the moving picture/still picture DB. If the necessity for recording a browse history is low, it may be not necessary to record it.

According to this embodiment, depending on whether the end user who has accessed the URL is the end user himself or herself who has made the decoration order, server 20 selects one of the transmission formats. Alternatively, server 20 may transmit the file in any one of the transmission formats regardless of whether or not the end user who has accessed the URL is the end user himself or herself who has made the decoration order.

According to this embodiment, articles are categorized as groups and the article selection screen has three levels as shown in FIG. 16 to FIG. 18. Alternatively, the article selection screen may be a screen on which the end user can select any article from a group of at least one article. Thus, the article selection screen is not limited to the structure shown in FIG. 16 to FIG. 18. For example, the user terminal may display the article selection screen in one level as shown in FIG. 17. Alternatively, the user terminal may display the article selection screen in many levels.

According to this embodiment, a mobile communication terminal is used as a user terminal. Alternatively, another communication terminal may be used as a user terminal as long as the communication terminal has a function that transmits a captured moving picture or still picture to server 20. For example, the user terminal may be a built-in type Web camera or a digital camera having a communication function. Further alternatively, the user terminal may be a personal computer that can store a moving picture or still picture captured by a digital camera and transmit the captured picture.

Individual functions of server 20 can be, of course, distributed to a plurality of communication devices. For example, as described later with reference to FIG. 28, functions for reception section 201, transmission section 202, and order management section 203, a function for decoration section 204, a function for storage section 205, and a function for delivery management section 206 can be distributed to a plurality of communication devices.

User terminal 10 according to this embodiment is an example of a communication terminal according to the present invention. The order key according to this embodiment corresponds to request identification information according to the present invention. The decoration request according to this embodiment corresponds to a request according to the present invention. The user ID according to this embodiment corresponds to user identification information according to the present invention.

As described above, according to this embodiment, when the server generates request identification information according to a decoration method and transmits the generated request identification information to the communication terminal and then the communication terminal transmits a captured moving picture or still picture that contains request identification information to the server, the server decorates the moving picture or still picture according to the decoration method corresponding to the request identification information, stores the decorated moving picture or still picture, and delivers the decorated moving picture or still picture that corresponds to a delivery request.

Thus, if the end user has a communication terminal that can communicate with the server, he or she can decorate a moving picture or the like at his or her favorite place without need to go to a place where the server is installed. Thus, the place at which the end user uses the decoration service is not limited. In addition, since the server delivers a stored moving picture or the like that corresponds to a delivery request, the end user can acquire a decorated moving picture or the like at his or her favorite time without being limited to a specific broadcasting period.

In addition, server 20 encrypts an order key, namely article identification information, and transmits the encrypted order key. Thus, the user ID can be prevented from being leaked out of the system.

In addition, server 20 transmits to user terminal 10 a URL that represents the storage location of a moving picture/still picture file rather than the file itself. The data that represents the URL is much smaller than the decorated moving picture/still picture file and can be easily copied and transmitted. Thus, the end user can easily publish a decorated moving picture/still picture file to his or her friends by copying the URL and transmitting it to them. By exchanging a URL having the same effect as a moving picture/still picture file, the end user can satisfactorily communicate with many people such as his or her friends.

Second Embodiment

Next, with reference to FIG. 21 to FIG. 26, a second embodiment of the present invention will be described. Moving picture/still picture processing system 1a according to this embodiment is different from moving picture/still picture processing system 1 according to the first embodiment in that the former also has a management terminal that can update the article DB.

Figure 21:
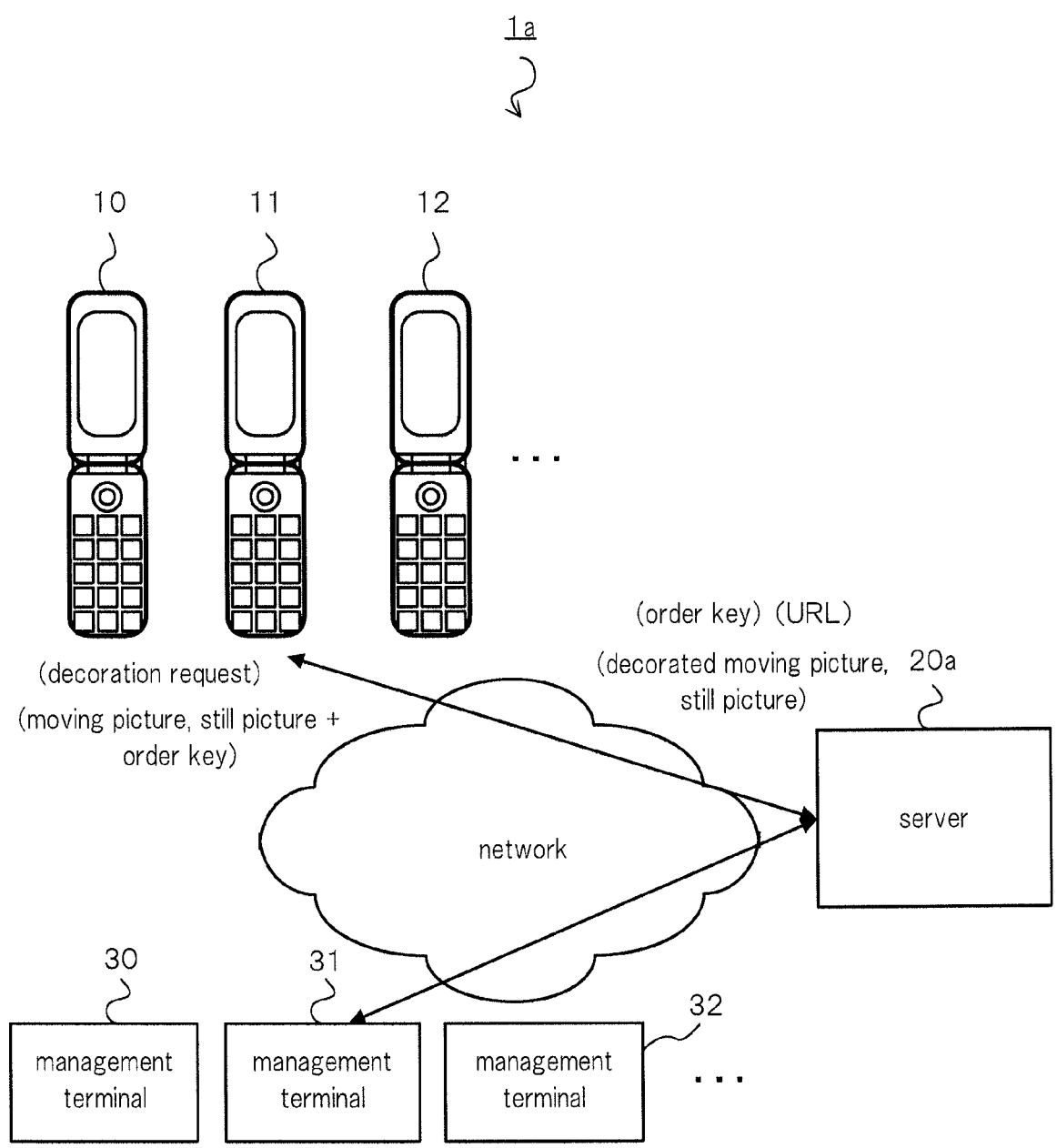
FIG. 21 is an example of an overall schematic diagram showing a moving picture/still picture processing system according to a second embodiment of the present invention.

FIG. 21 is an example of an overall schematic diagram that shows moving picture/still picture processing system 1a according to the second embodiment. Referring to the drawing, moving picture/still picture processing system 1a according to the second embodiment is different from moving picture/still picture processing system 1 according to the first embodiment in that the former has server 20a instead of server 20 and also has at least one management terminal such as management terminals 30, 31, and 32.

Management terminal 30 and so forth are terminals on which users add an article to the article DB located in server 20, delete an article therefrom, and update the article DB. These management terminals are used for example by a content provider. In addition, server 20a manages and operates an article management site at which the content provider adds, deletes, or updates an article.

Figure 22:
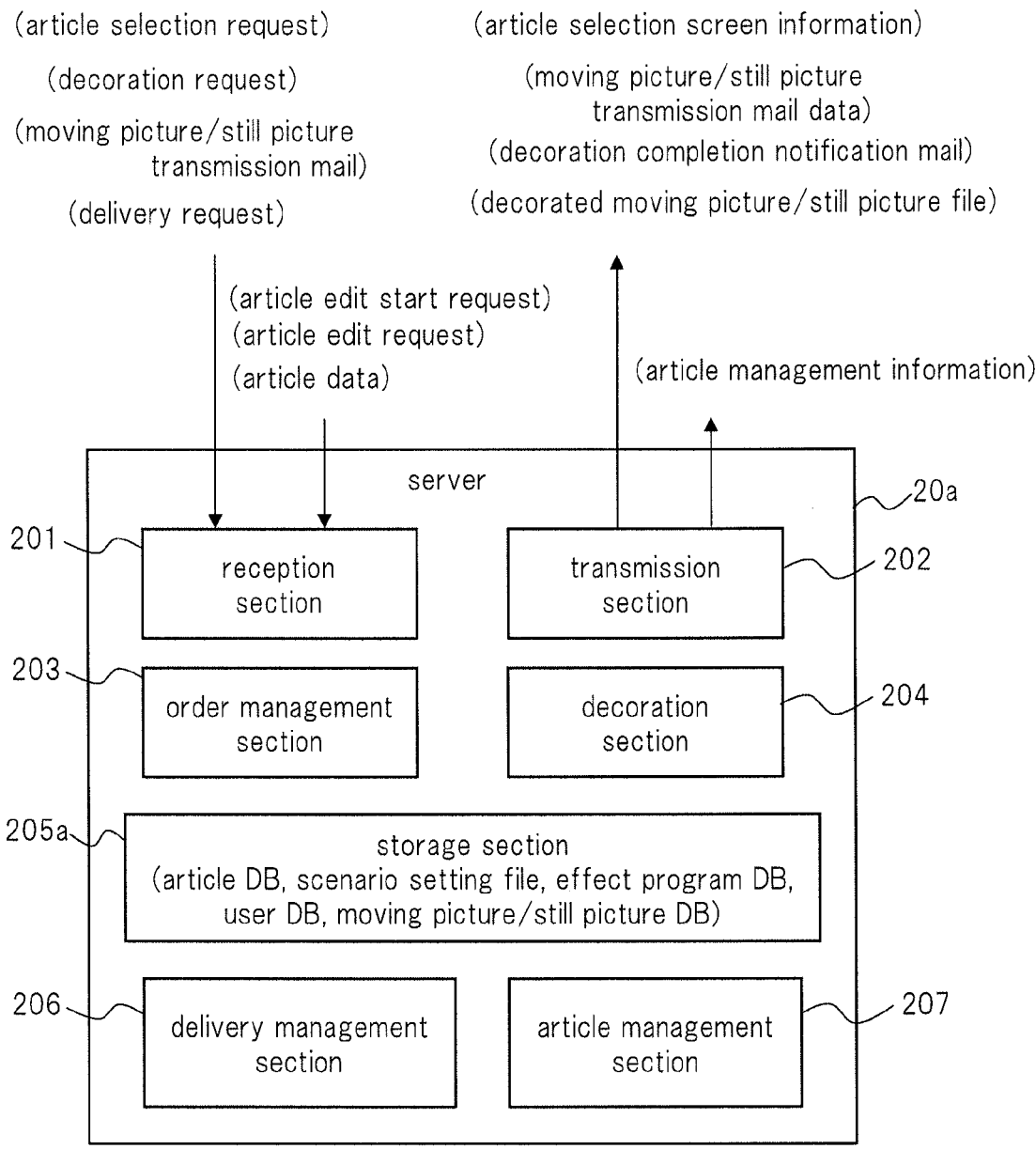
FIG. 22 is a block diagram showing an example of a structure of a server according to the second embodiment of the present invention.

FIG. 22 is a block diagram showing an example of a structure of server 20a according to this embodiment. Referring to the drawing, server 20a according to this embodiment is different from server 20 according to the first embodiment in that the former has storage section 205a instead of storage section 205 and also has article management section 207.

Information stored in storage section 205 is the same as information stored in storage section 205 according to the first embodiment in that the former also stores a CPID. A CPID is information that identifies a content provider.

Figure 23:
FIG. 23 is a schematic diagram showing an example of information stored in an article DB according to the second embodiment of the present invention.

FIG. 23 is a schematic diagram showing an example of information stored in the article DB according to this embodiment. As shown in the drawing, the article DB also stores a CPID corresponding to an article ID.

Next, structures of order management server 20b and management terminal 30 and so forth according to this embodiment will be described that corresponds to an operation procedure.

When the content provider accesses the article management site using management terminal 30 or the like, it transmits an article edit start request that contains the CPID to server 20a.

Reception section 201 of server 20a receives the article edit start request. Article management section 207 reads information corresponding to the CPID contained in the article edit start request from the article ID. For example, article management section 207 reads an article ID, a decoration article name, a scenario identifier, a material, a sample moving picture, and so forth that corresponds to the CPID from the article DB. Server 20a transmits article management information that represents information that has been read from article DB to the management terminal through article management section 207 and transmission section 202.

Management terminal 30 or the like displays the content of the article management information. Management terminal 30 or the like transmits to server 20a an article edit request that causes server 20a to add, update, or delete an article along with the CPID by the operation of the content provider. If an article is updated and deleted, an article ID of an article to be updated and deleted is added to the article edit request. In contrast, if an article is updated and added, updated article data or article data to be added are transmitted along with the article edit request.

The article data contain a scenario identifier and data of a material. Management terminal 30 or the like may add a sample moving picture/still picture file to the article data and transmits the article data.

Reception section 201 of server 20a receives either an article edit request or an article edit request and article data. Article management section 207 updates the article DB that corresponds to the article edit request. If an article is added, article management section 207 generates an article ID assigned to the added article and registers the article ID to the article DB. Article management section 207 reads information corresponding to the CPID from the updated article DB and transmits the information as article management information to the management terminal through transmission section 202.

Figure 24:
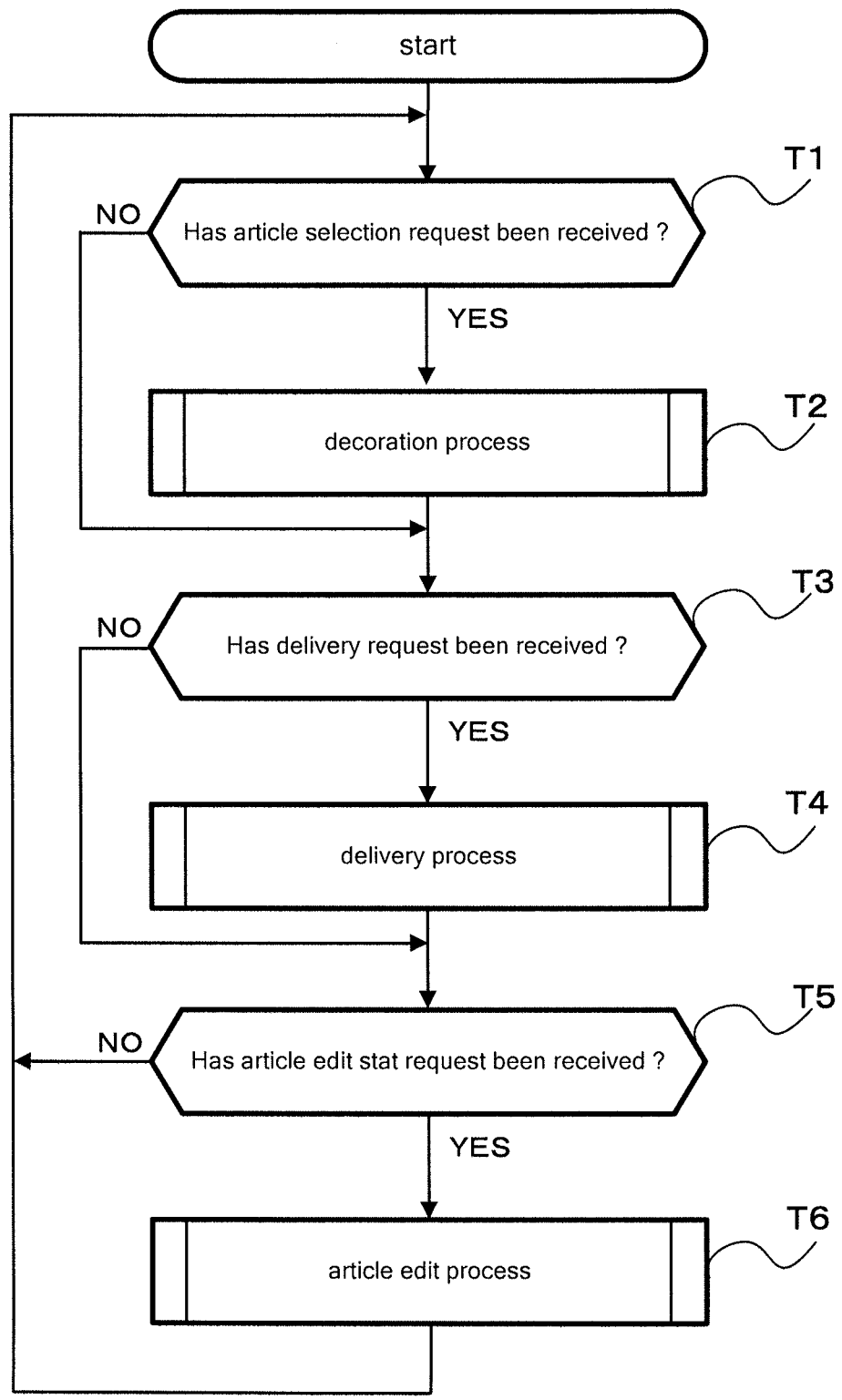
FIG. 24 is a flow chart showing an operation of a server according to the second embodiment of the present invention.

Next, with reference to FIG. 24 to FIG. 27, the operation of moving picture/still picture processing system 1a will be described. FIG. 24 is a flow chart showing the operation of server 20a. As shown in the drawing, the operation of server 20a is the same as the operation of server 20 according to the first embodiment except that the former also executes steps T5 and T6.

Unless server 20a has received the delivery request (NO at step T3) or after step T4 is executed, server 20a determines whether or not it has received an article edit start request from the management terminal (at step T5).

If server 20a receives the article edit start request (YES at step T5), server 20a starts the article edit process that edits the content of articles (at step T6).

Unless server 20a receives the article edit start request (NO at step T5) or after step T6 is executed, server 20a returns to step T1.

Figure 25:
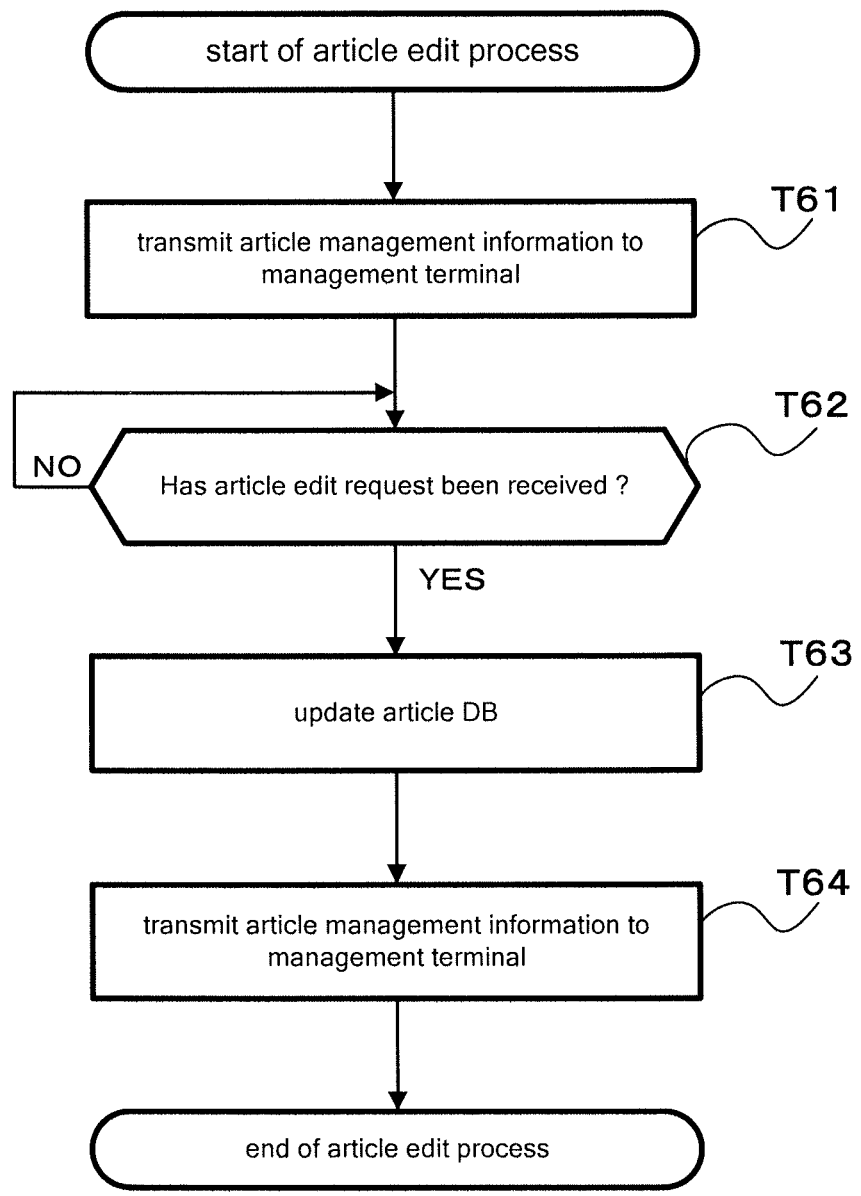
FIG. 25 is a flow chart showing an article editing process according to the second embodiment of the present invention.

FIG. 25 is a flow chart showing the article edit process. Referring to the drawing, server 20a reads information corresponding to the CPID contained in the article edit start request from the article ID and transmits the information as article management information to the management terminal (at step T61).

Order management server 20b determines whether or not it has received an article edit request from the management terminal (at step T62). Unless order management server 20b has received the article edit request (NO at step T62), order management server 20b returns to step T62.

If order management server 20b has received the article edit request (YES at step T62), server 20a updates the article DB corresponding to the article edit request (at step T63). Server 20a reads information corresponding to the CPID from the updated article DB and transmits the information as article management information to the management terminal (at step T64). After step T64, server 20a completes the article edit process.

Figure 26:
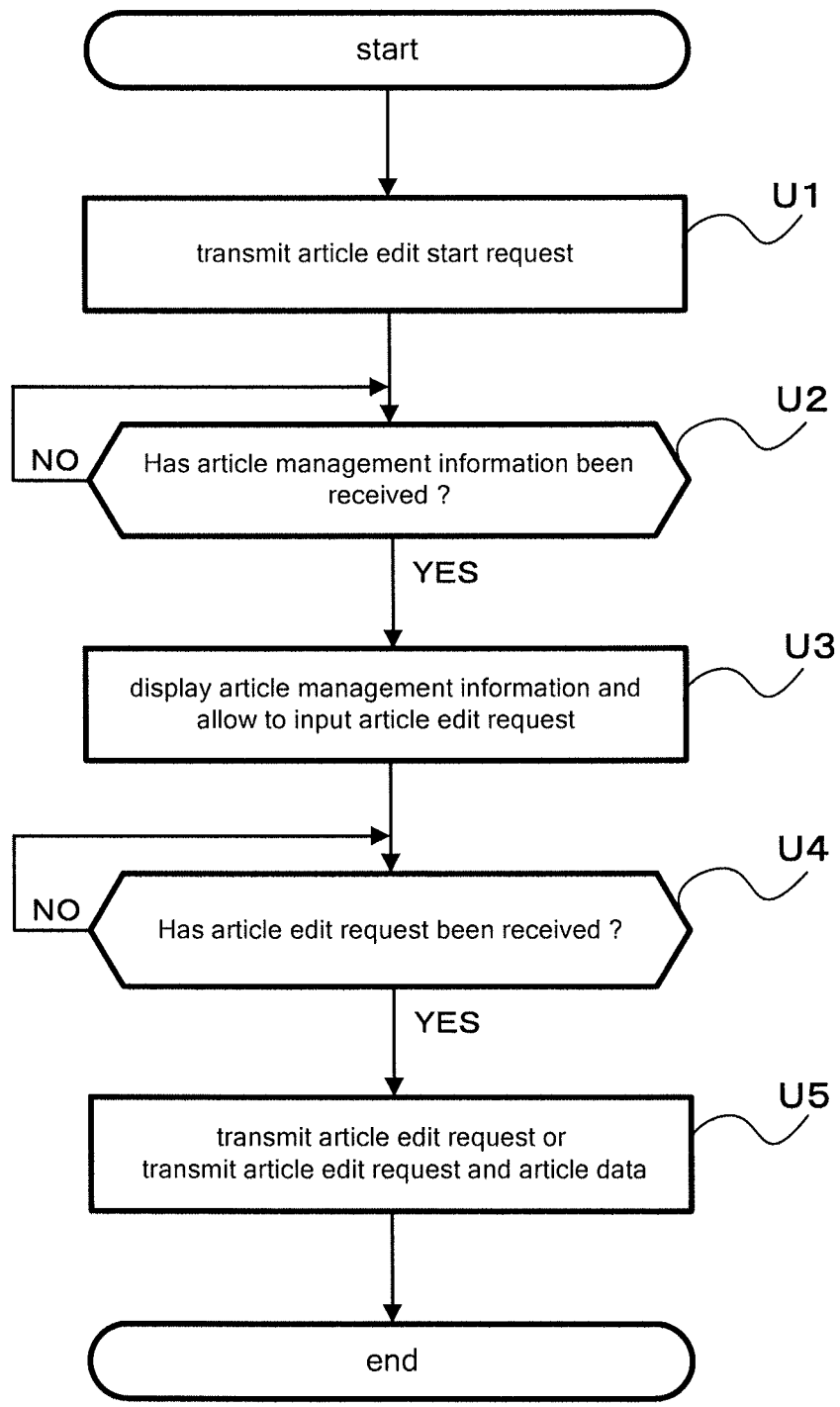
FIG. 26 is a flow chart showing an operation of a management terminal according to the second embodiment of the present invention.

FIG. 26 is a flow chart showing an operation of management terminal 30. The operation of each of other management terminals such as management terminals 31 and 32 is the same as the operation of management terminal 30. When the content provider performs an operation that accesses the article management site using management terminal 30, it starts the operation shown in FIG. 26.

Management terminal 30 transmits the article edit start request that contains the CPID to server 20a (at step U1). Management terminal 30 determines whether or not it has received the article management information from server 20a (at step U2). Unless management terminal 30 has received the article management information (NO at step U2), management terminal 30 returns to step U2.

If management terminal 30 has received the article management information (YES at step U2), management terminal 30 displays the article management information and allows the content provider to input an article edit request (at step U3).

Management terminal 30 determines whether or not it has input the article edit request (at step U4). Unless management terminal 30 has input the article edit request (NO at step U4), management terminal 30 returns to step U4.

If management terminal 30 has input the article edit request (YES at step U4), management terminal 30 transmits the article edit request. If an article is added and updated, management terminal 30 transmits article data to be added and updated along with the article edit request (at step U5). After step U5, management terminal 30 completes the operation.

Figure 27:
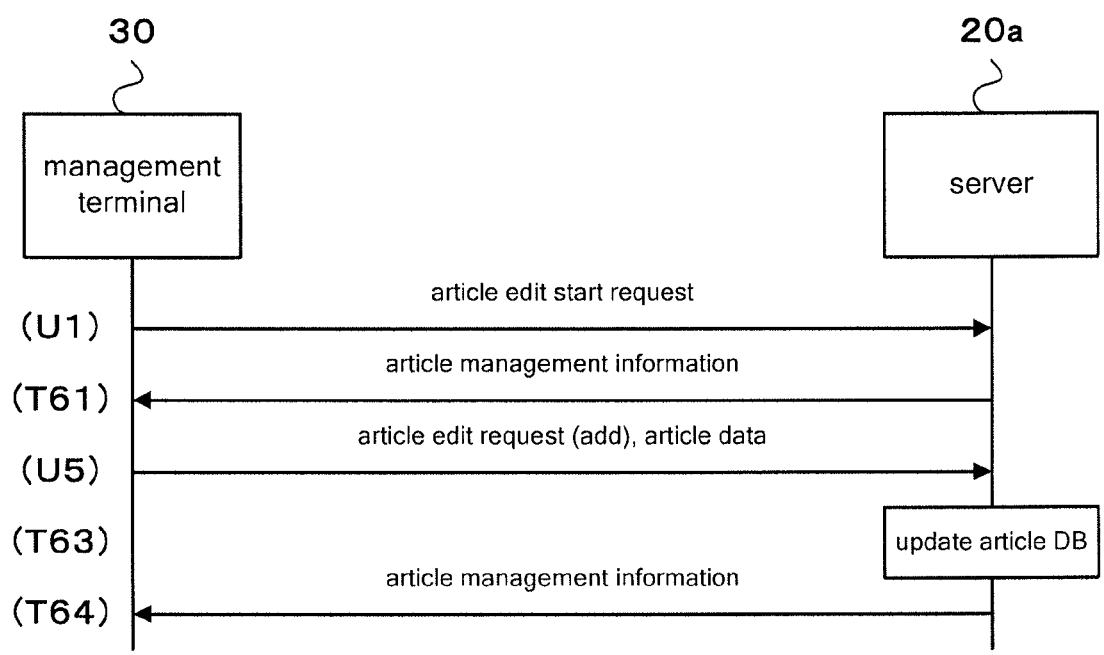
FIG. 27 is a sequence diagram showing an example of an operation of the moving picture/still picture processing system according to the second embodiment of the present invention.

FIG. 27 is a sequence diagram showing an example of an operation of moving picture/still picture processing system 1a. For example, it is assumed that moving picture/still picture processing system 1a adds an article.

When the content provider accesses the article management site using management terminal 30, it transmits the article edit start request that contains the CPID to order management server 20b (at step U1).

Server 20a reads information corresponding to the CPID contained in the article edit start request from the article ID and transmits the information as article management information to management terminal 30 (at step T61).

Management terminal 30 transmits to server 20a the article edit request that causes server 20a to add an article and article data to be added (at step U5).

Server 20a generates an article ID and stores article data added and that corresponds to the article ID to the article DB (at step T63). Server 20a reads information corresponding to the CPID from the updated article DB and transmits the information to the management terminal (at step T64).

As described above, according to this embodiment, since content providers can edit the content of the article DB using their management terminal, many content providers have opportunities to provide articles. As a result, kinds of articles provided can be enriched.

Third Embodiment

Next, with reference to FIG. 28 to FIG. 42, a third embodiment of the present invention will be described. Moving picture/still picture processing system 1b according to this embodiment is different from moving picture/still picture processing system 1 according to the first embodiment in that a server performs a charging process, in which a decoration process is prevented from being performed a plurality of times per decoration order, in which the functions of the server are distributed, and in which contingencies are handled.

Figure 28:
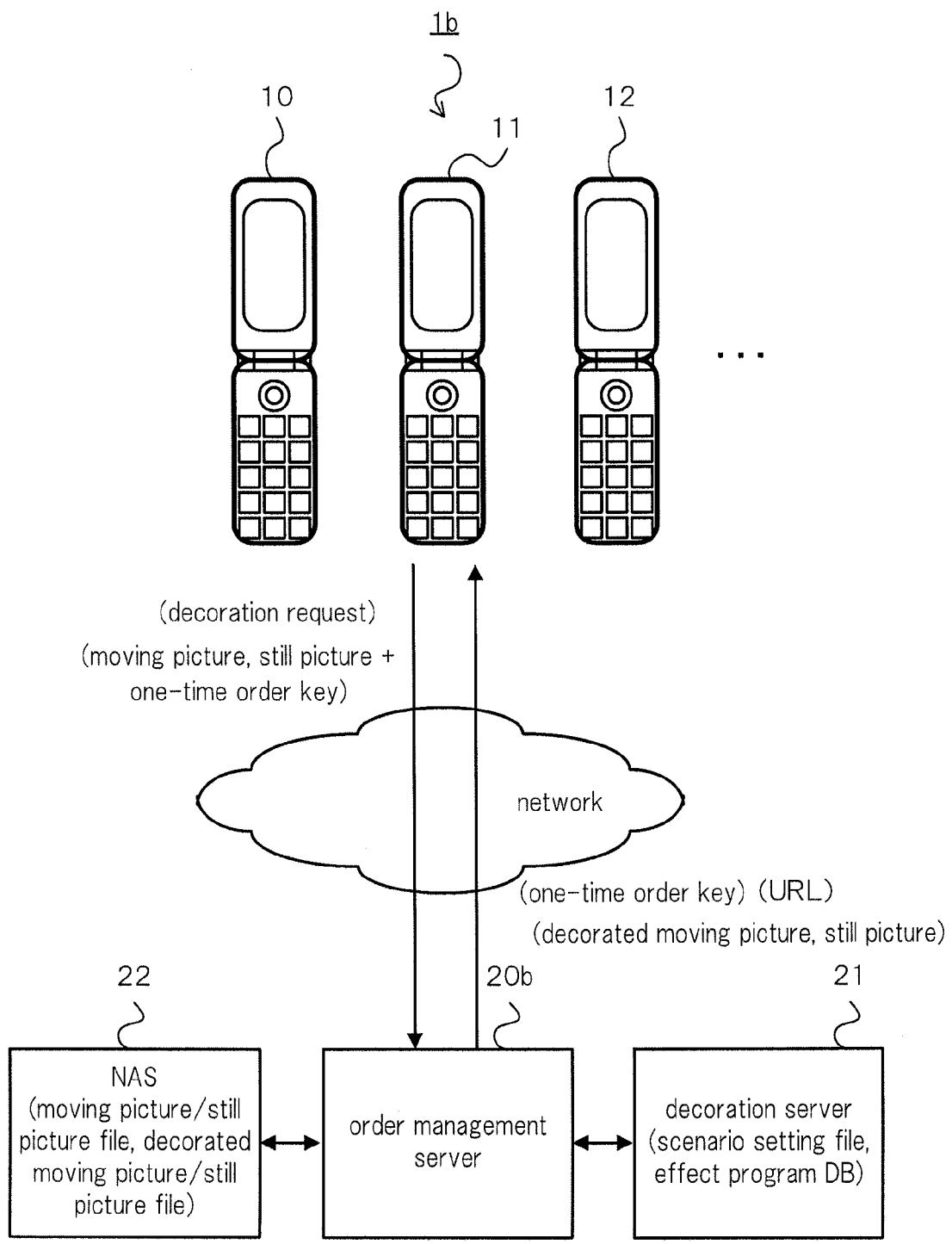
FIG. 28 is an example of an overall schematic diagram showing a moving picture/still picture processing system according to a third embodiment of the present invention.

FIG. 28 is an example of an overall schematic diagram showing moving picture/still picture processing system 1b. Referring to the drawing, moving picture/still picture processing system 1b according to this embodiment is different from moving picture/still picture processing system 1 according to the first embodiment in that the former has order management server 20b, decoration server 21, and NAS (Network Attached Storage) 22 instead of server 20.

The function of decoration server 21 according to this embodiment is the same as the function of decoration section 204 according to the first embodiment. NAS 22 stores moving picture/still picture files and decorated moving picture/still picture files.

Figure 29:
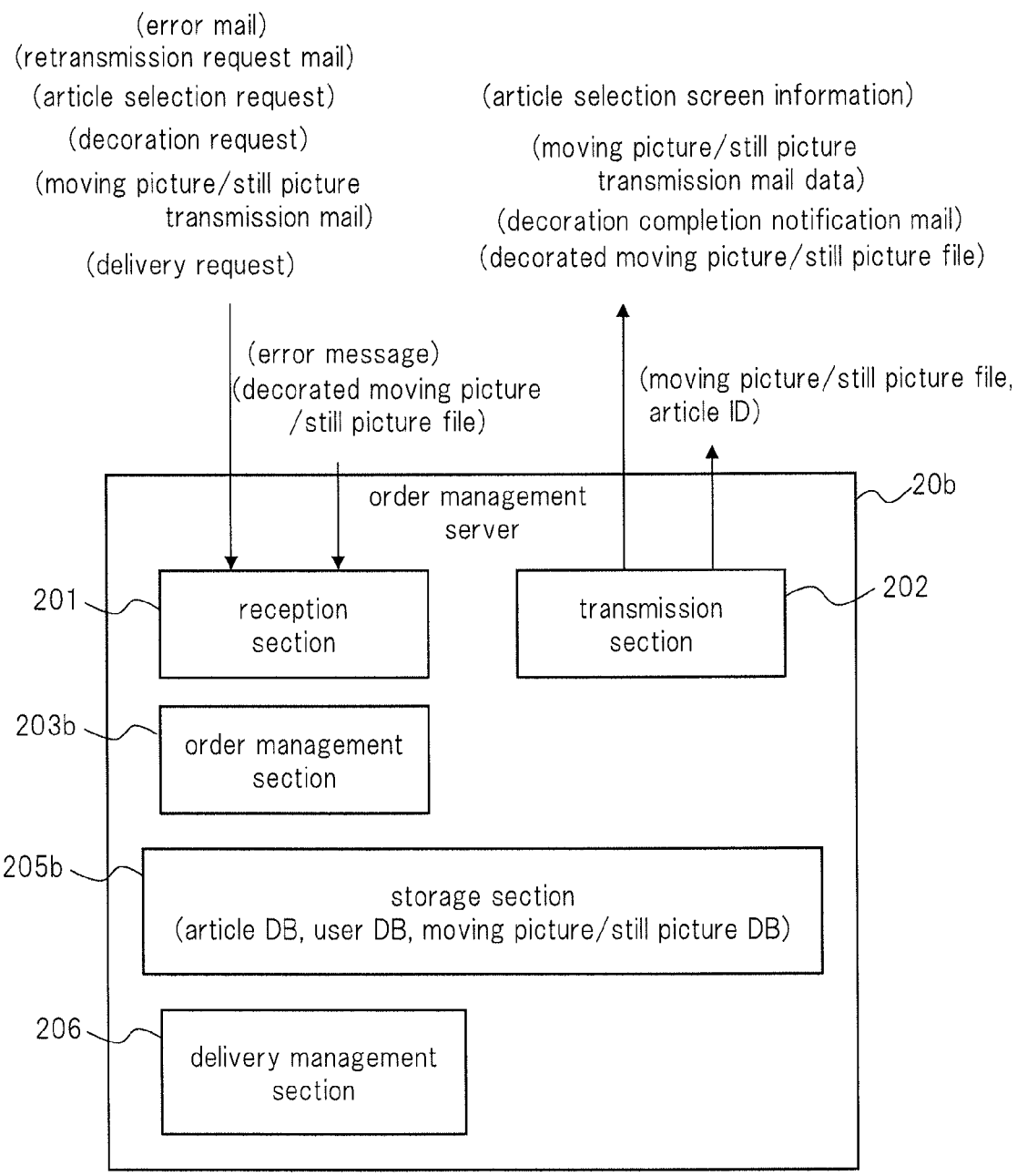
FIG. 29 is a block diagram showing an example of a structure of an order management server according to the third embodiment of the present invention.

FIG. 29 is a block diagram showing an example of a structure of order management server 20b according to this embodiment. Referring to the drawing, order management server 20b has the same structure as server 20 according to the first embodiment except that the former does not have decoration section 204, but order management section 203b and storage section 205b instead of order management section 203 and storage section 205.

When order management section 203b receives a user ID and an article ID, order management section 203b performs a charging process including a payment check, a payment process, and a point reduction process. If order management section 203b has normally completed the charging process, order management section 203b generates an order key.

Order management section 203b generates a one-time key as an order key such that decoration server 21 performs a decoration process once per decoration order. Hereinafter, this order key is referred to as "one-time order key."

If decoration server 21 has completed the decoration process, order management section 203b deletes the one-time order key. However, order management section 203b logically deletes the one-time order key by invalidating it, but does not directly delete data indicating the one-time order key.

If order management section 203b receives moving picture/still picture transmission mail that contains a one-time order key that has been deleted, namely invalidated, order management section 203b does not transmit the attached moving picture/still picture file to decoration server 21. In this case, order management section 203b transmits error mail that denotes that a decoration process that corresponds to a decoration order has been completed to the user terminal.

If a moving picture or still picture that corresponds to an invalid one-time order key needs to be redecorated, server 20 validates the order key.

Next, the case in which a moving picture or still picture needs to be redecorated will be described. If decoration server 21 succeeds in the decoration process, server 20 invalidates the one-time order key and stores the decorated moving picture/still picture file in NAS 22. If system trouble occurs in NAS 22 or a communication error occurs in NAS 22, it may fail to store a decorated moving picture/still picture file.

If order management server 20b detects that NAS 22 has failed to store the decorated moving picture/still picture file, order management server 20b validates a one-time order key that corresponds to the moving picture/still picture file that NAS 22 has failed to store. Thereafter, order management server 20b transmits to the user terminal the retransmission request mail that contains text that represents a moving picture retransmission request and text of moving picture/still picture transmission mail data.

The user terminal transmits moving picture/still picture transmission mail that contains text of the moving picture/still picture transmission mail data and a moving picture/still picture file to order management server 20b.

An end user who views a decorated moving picture/still picture file may not be satisfied with the content or may know that he or she failed to make a decoration order because of an operation mistake. In this case, the end user may request the content provider of the management terminal or the supervisor of order management server 20b to redecorate the moving picture/still picture file without any extra charge.

If such a situation occurs, order management server 20b validates the one-time order key and transmits retransmission request mail to the user terminal by the operation of the supervisor. The user terminal transmits moving picture/still picture transmission mail that corresponds to the retransmission request mail.

Since order management server 20b logically deletes a one-time order key, but does not directly delete the one-time key, order management server 20b can handle contingencies.

Storage section 205b stores an article DB, a user DB, and a moving picture/still picture DB. Decoration server 21 stores a scenario setting file and an effect program DB.

Figure 30:
FIG. 30 is a schematic diagram showing an example of information stored in a user DB according to the third embodiment of the present invention.

FIG. 30 is a schematic diagram showing information stored in the user DB according to this embodiment. Referring to the drawing, the user DB according to this embodiment has "invalid flag" that corresponds to "one-time order key."

The invalid flag is a flag that denotes whether or not the corresponding one-time order key is invalid. For example, if the corresponding one-time order key is valid, the invalid flag is set to "0"; if the corresponding one-time order key is invalid, the invalid flag is set to "1."

When order management server 20b generates a one-time order key, order management server 20b sets the invalid flag that corresponds to the key to "0" so as to validate the key. When the decoration process for a moving picture or still picture that corresponds to a one-time order key has been completed, order management server 20b sets the invalid flag that corresponds to the key to "1" so as to invalidate the key. If a moving picture or still picture needs to be redecorated, order management server 20b sets the invalid flag that corresponds to the key to 0" so as to validate it again.

Figure 31:
FIG. 31 is a schematic diagram showing an example of information stored in a moving picture/still picture DB according to the third embodiment of the present invention.

FIG. 31 is a schematic diagram showing information stored in the moving picture/still picture DB according to this embodiment. Referring to the drawing, the moving picture/still picture DB also has "decoration completion flag" that corresponds to "received moving picture/still picture."

The decoration completion flag is a flag that denotes whether or not the decoration process for a moving picture or still picture has been completed. If the decoration process for a corresponding moving picture or still picture has not been completed, the decoration completion flag is set to "0"; if it has been completed, the decoration completion flag is set to "1."

When a pre-decorated moving picture or still picture is stored, order management server 20b sets the decoration completion flag that corresponds to the moving picture or still picture to "0." When decoration server 21 has completed the decoration process for a moving picture or still picture, order management server 20b sets the decoration completion flag that corresponds to the decorated moving picture or still picture to "1." Thereafter, order management server 20b stores the decorated moving picture/still picture file to NAS 22.

Figure 32:
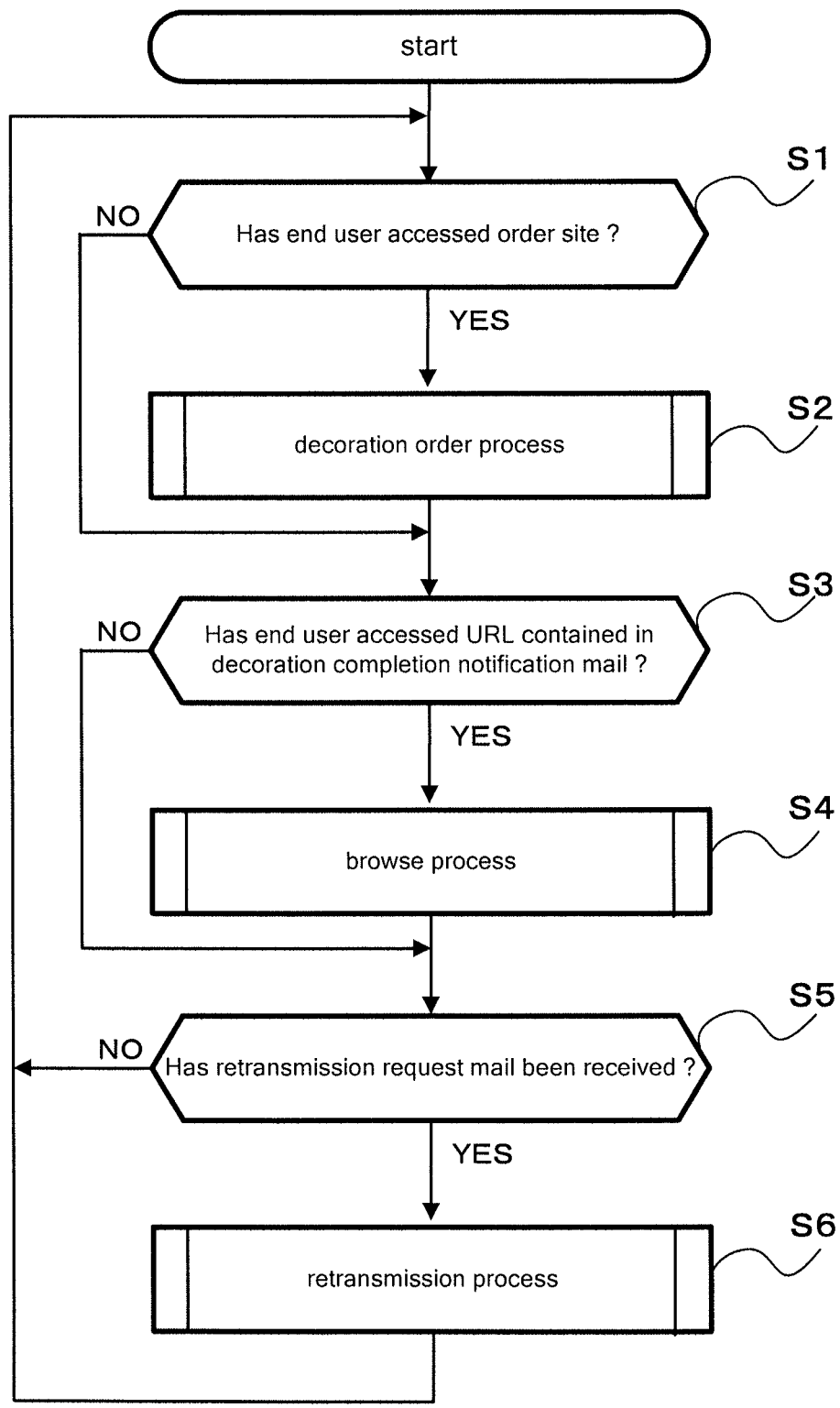
FIG. 32 is a flow chart showing an operation of a user terminal according to the third embodiment of the present invention.

FIG. 32 is a flow chart showing an operation of user terminal 10 according to this embodiment. The operation of each of other user terminals such as user terminals 11 and 12 is the same as the operation of user terminal 10. As shown in the drawing, the operation of user terminal 10 according to this embodiment is the same as the operation of user terminal 10 according to the first embodiment except that the former also executes steps S5 and S6.

If the end user has not accessed a URL contained in decoration completion notification mail (NO at step S3) or after step S4 is executed, user terminal 10 determines whether or not it has received retransmission request mail from order management server 20b (at step S5).

If user terminal 10 has received the retransmission request mail (YES at step S5), user terminal 10 executes a retransmission process that retransmits the moving picture/still picture file (at step S6).

Unless user terminal 10 has received the retransmission request mail (NO at step S5) or after step S6 is executed, user terminal 10 returns to step S1.

Figure 33:
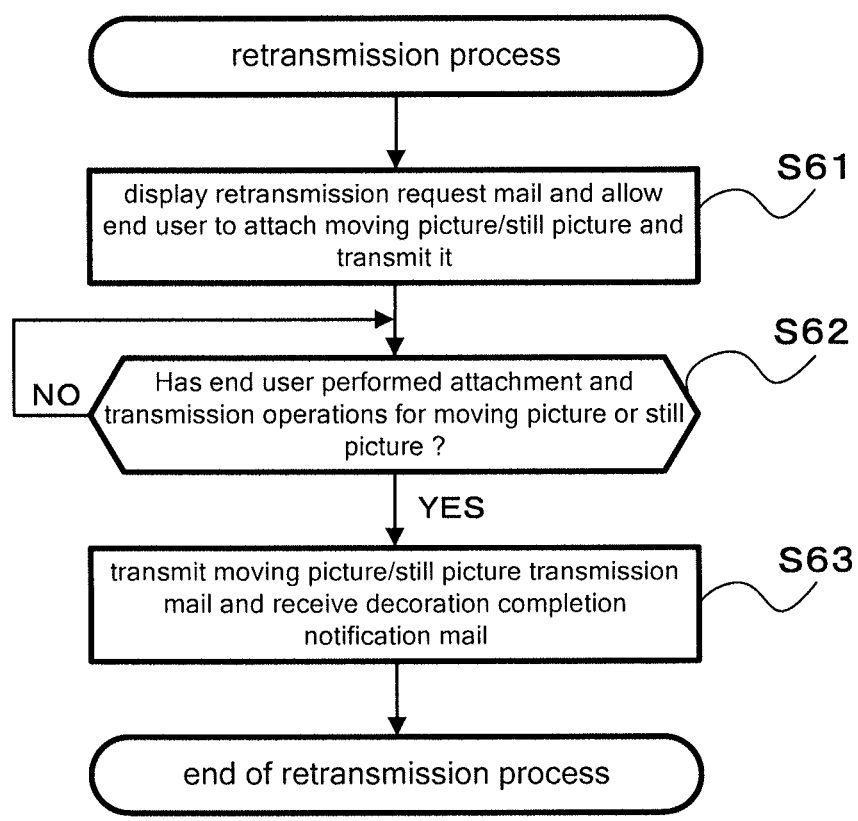
FIG. 33 is a flow chart showing a retransmission process according to the third embodiment of the present invention.

FIG. 33 is a flow chart showing a retransmission process. Referring to the drawing, user terminal 10 displays the content of the retransmission request mail and allows the end user to perform an attachment operation for a moving picture or still picture and a transmission operation for the moving picture/still picture transmission mail (at step S61).

User terminal 10 determines whether or not the end user has performed the attachment operation for a moving picture or still picture to the moving picture/still picture transmission mail and also determines whether or not the end user has performed the transmission operation for the moving picture/still picture transmission mail (at step S62). Unless the end user has performed the attachment operation for the moving picture or the like and the transmission operation for the moving picture/still picture transmission mail (NO at step S62), user terminal 10 returns to step S62.

If the end user has performed the attachment operation for the moving picture or the like and transmission operation for the moving picture/still picture transmission mail (YES at step S62), user terminal 10 transmits moving picture/still picture transmission mail. Order management server 20b decorates the moving picture or still picture attached to the moving picture/still picture transmission mail and transmits decoration completion notification mail that contains a URL to the user terminal. User terminal 10 receives the decoration completion notification mail and displays it (at step S63). After step S63, user terminal 10 completes the retransmission process.

Figure 34:
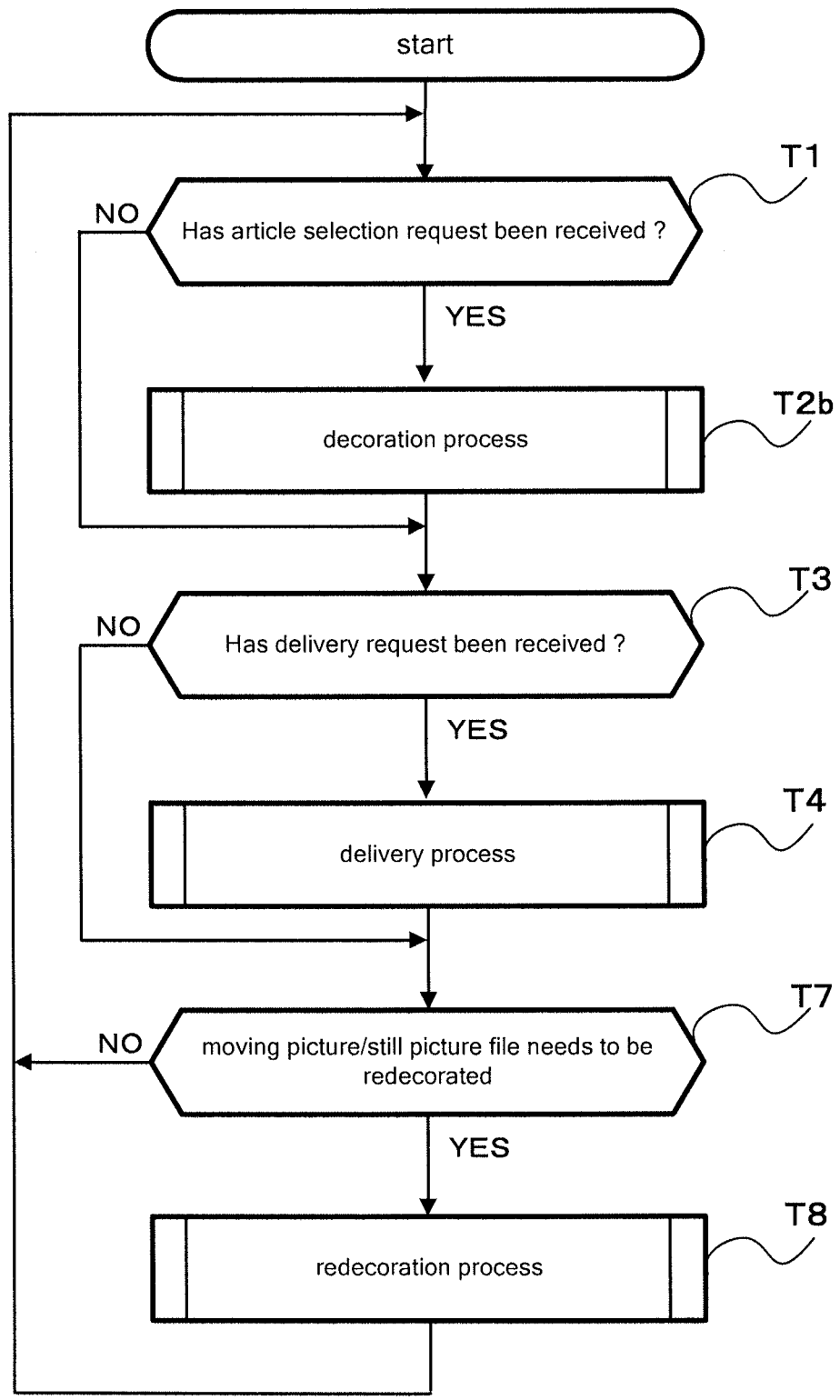
FIG. 34 is a flow chart showing an operation of an order management server according to the third embodiment of the present invention.

FIG. 34 is a flow chart showing an operation of order management server 20b according to this embodiment. As shown in the drawing, the operation of order management server 20b is the same as the operation of server 20 according to the first embodiment except that the former also executes steps T7 and T8.

Unless order management server 20b has received a delivery request (NO at step T3) or after step T4 is executed, order management server 20 determines whether or not the moving picture/still picture file needs to be redecorated (at step T7).

If the moving picture or still picture needs to be redecorated (YES at step T7), order management server 20b executes a redecoration process that redecorates the moving picture/still picture file (at step T8).

If the moving picture or still picture does not need to be redecorated (NO at step T7) or after step T8 is executed, order management server 20b returns to step T1.

Figure 35:
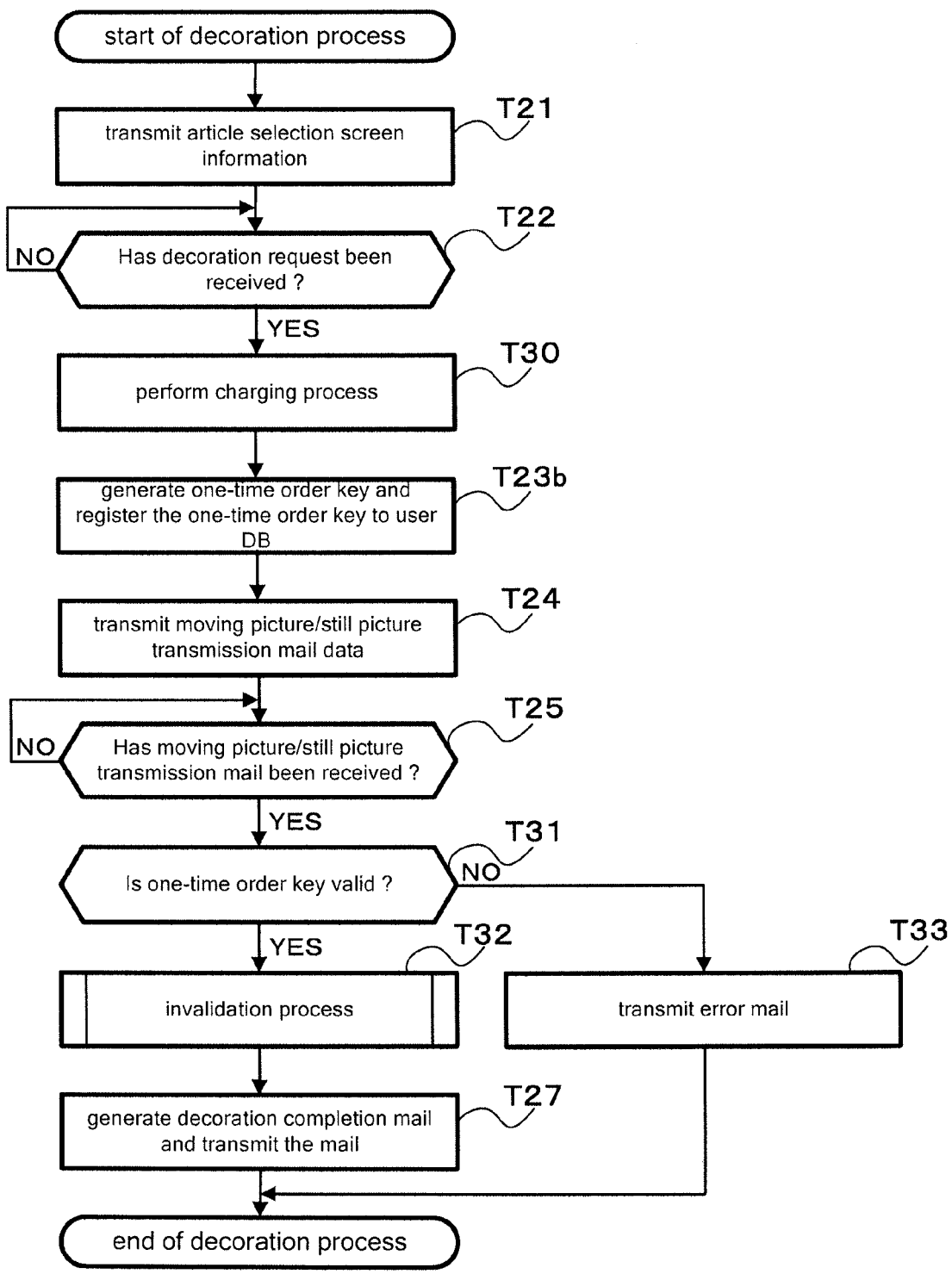
FIG. 35 is a flow chart showing a decoration process according to the third embodiment of the present invention.

FIG. 35 is a flow chart showing a decoration process according to this embodiment. Referring to the drawing, the decoration process according to this embodiment is the same as the decoration process according to the first embodiment except that the former executes step T23b instead of step T23 and also executes steps T30, T31, T32, and T33 instead of step T26.

If order management server 20b has transmitted article selection screen information and then received a decoration request (YES at step T22), order management server 20b performs a charging process including a payment check, a payment process, and a point reduction process (at step T30). After order management server 20b has normally completed the charging process, order management server 20b generates a one-time order key and registers it to the user DB (at step T23b).

If order management server 20b has transmitted the moving picture/still picture transmission mail data and then received the moving picture/still picture transmission mail (YES at step T25), order management server 20b reads the value of the invalid flag corresponding to the one-time order key contained in the moving picture/still picture transmission mail from the user DB. Thereafter, order management server 20b determines whether or not the one-time order key is valid based on the value of the invalid flag (at step T31).

If the one-time order key is valid (YES at step T31), order management server 20b decorates the moving picture or still picture and performs an invalidation process that validates the one-time order key (at step T32). Order management server 20b adds a URL that represents the storage location of the decorated moving picture/still picture file to the decoration completion notification mail and transmits the mail to the user terminal (at step T27).

If the one-time order key is invalid (NO at step T31), order management server 20b transmits error mail that denotes that the attached moving picture/still picture file cannot be decorated to the user terminal (at step T33). After step T27 or T33, order management server 20b completes the decoration process.

Figure 36:
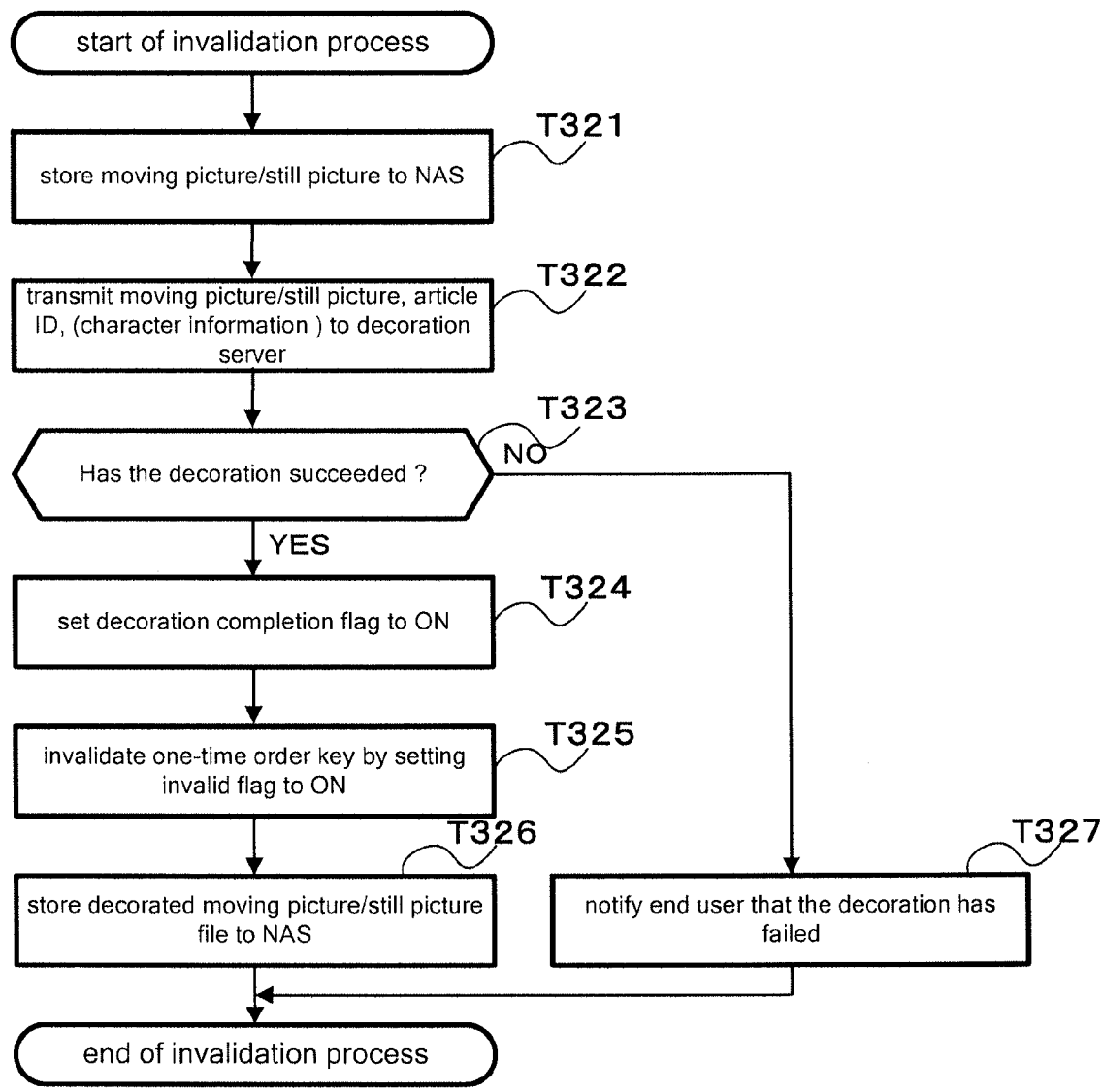
FIG. 36 is a flow chart showing an invalidation process according to the third embodiment of the present invention.

FIG. 36 is a flow chart showing the invalidation process. Referring to the drawing, order management server 20b stores the moving picture/still picture file transmitted from user terminal 10 to NAS 22 (at step T321). Thereafter, order management server 20b transmits the moving picture/still picture file and the article ID to decoration server 21. If a subtitle or the like is added to the moving picture/still picture file, order management server 20b transmits not only the moving picture/still picture file and the article ID, but also character information that represents the content of the subtitle (at step T322).

Order management server 20b determines whether or not decoration server 21 has completed the decoration process (at step T323).

If order management server 20b has received a decorated moving picture/still picture file that corresponds to the moving picture/still picture file from decoration server 21, order management server 20b determines that decoration server 21 has completed the decoration process. If order management server 20b has received an error message that denotes that decoration server 21 had failed to perform the decoration process or has not received a decorated moving picture/still picture file from decoration server 21 after order management server 20b has transmitted the moving picture/still picture file and then a predetermined period has elapsed, order management server 20b determines that decoration server 21 has failed to perform the decoration process.

If decoration server 21 has succeeded in performing the decoration process (YES at step T323), order management server 20b sets the decoration completion flag corresponding to the moving picture/still picture file to "1" (ON) (at step T324). Thereafter, order management server 20b sets the corresponding invalid flag to "1" (ON) so as to invalidate the one-time order key (at step T325).

Order management server 20b stores the decorated moving picture/still picture file received from decoration server 21 to NAS 22 and records a URL that represents the storage location of the decorated moving picture/still picture file to the moving picture/still picture DB (at step T326).

If decoration server 21 has failed to perform the decoration process (NO at step T323), while order management server 20b keeps the invalid flag OFF, order management server 20b notifies the end user that decoration server 21 has failed to perform the decoration process using mail or the like (at step T327). After step T326 or T327, order management server 20b completes the invalidation process.

Figure 37:
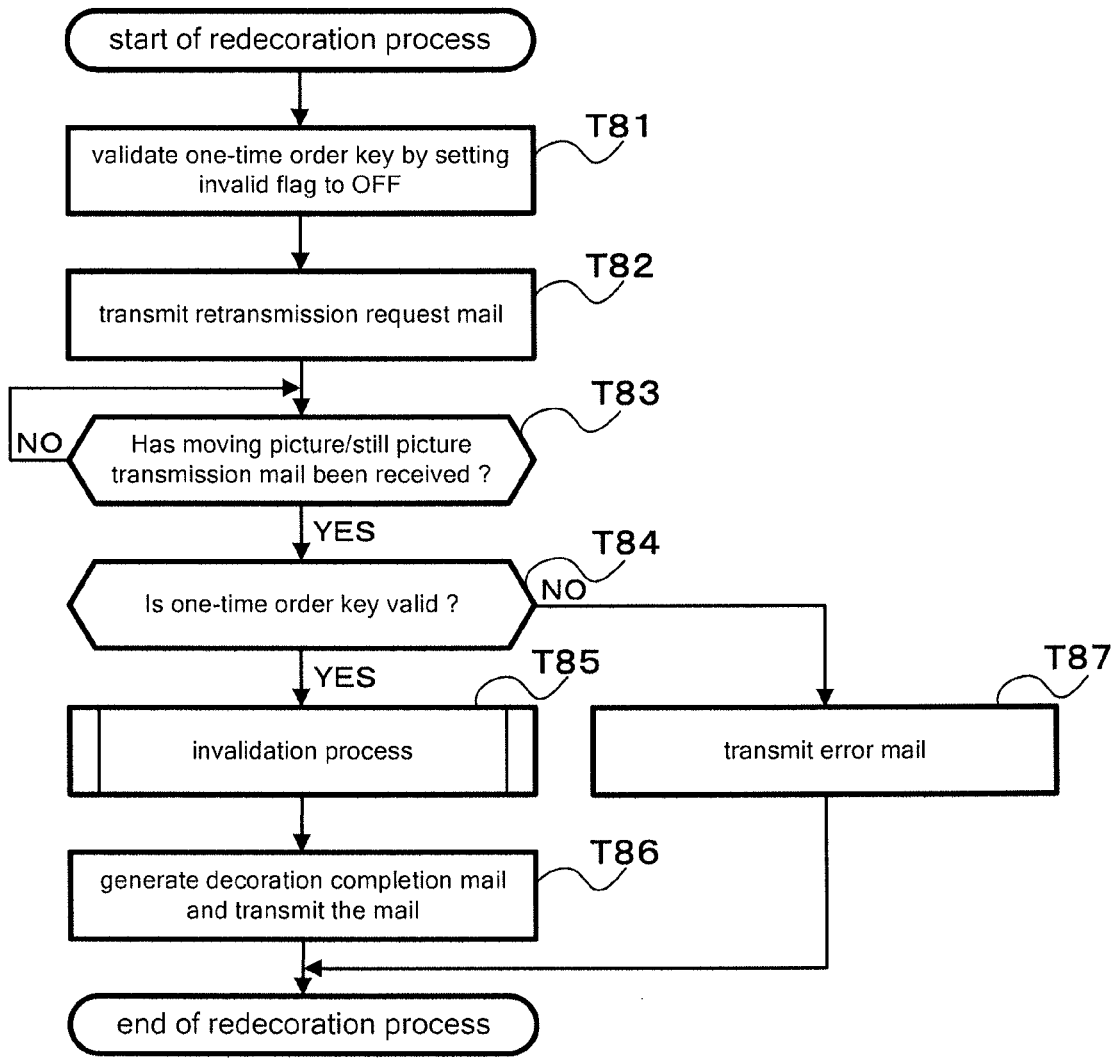
FIG. 37 is a flow chart showing a redecoration process according to the third embodiment of the present invention.

FIG. 37 is a flow chart showing the redecoration process. Referring to the drawing, order management server 20b sets the corresponding invalid flag to "0" (OFF) so as to validate the one-time order key (at step T81).

Order management server 20b transmits retransmission request mail that contains text that requests the user terminal to retransmit a moving picture and text of moving picture/still picture transmission mail data to the user terminal (at step T82).

Order management server 20b determines whether or not it has received the moving picture/still picture transmission mail from the user terminal (at step T83). Unless order management server 20b has received the moving picture/still picture transmission mail (NO at step T83), order management server 20b returns to step T83.

If order management server 20b has received the moving picture/still picture transmission mail (YES at step T83), order management server 20b refers to the user DB and determines whether or not the one-time order key contained in the moving picture/still picture transmission mail is valid (at step T84).

If the one-time order key is valid (YES at step T84), order management server 20b executes the invalidation process (at step T85). This invalidation process is the same as the invalidation process described with reference to FIG. 36. Order management server 20b adds a URL that represents the storage location of the decorated moving picture/still picture file to the decoration completion notification mail and transmits the mail to the user terminal (at step T86).

If the one-time order key is invalid (NO at step T84), order management server 20b transmits error mail to the user terminal (at step T86). After step T86 or T87, order management server 20b completes the decoration process.

Figure 38:
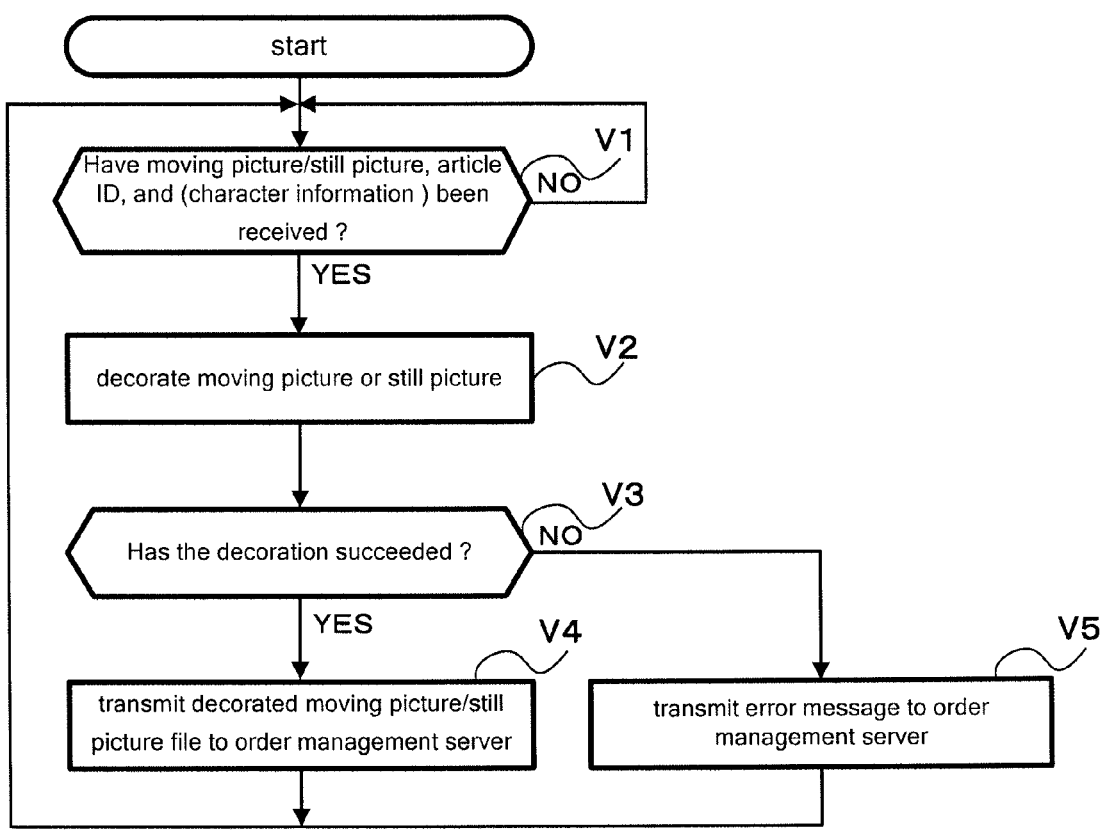
FIG. 38 is a flow chart showing an operation of a decoration server according to the third embodiment of the present invention.

FIG. 38 is a flow chart showing an operation of decoration server 21. When the power of decoration server 21 is turned on, decoration server 21 starts operating. Referring to the drawing, decoration server 21 determines whether or not it has received an article ID and a moving picture/still picture file from order management server 20b (at step V1). If a subtitle or the like is added, order management server 20b also transmits character information of the subtitle or the like to decoration server 21.

If decoration server 21 has received an article ID and a moving picture/still picture file, decoration server 21 decorates the moving picture or still picture according to the decoration method that corresponds to the article ID (at step V2).

Decoration server 21 determines whether or not it has succeeded in performing the decoration process (at step V3). If decoration server 21 has succeeded in performing the decoration process (YES at step V3), decoration server 21 transmits the decorated moving picture/still picture file to order management server 20*b* (at step V4).

If decoration server 21 has failed to perform the decoration process (NO at step V3), decoration server 21 transmits an error message that denotes that it has failed to perform the decoration process to order management server 20*b* (at step V5). After steps V4 and V5, decoration server 21 returns to step V1.

Figure 39:
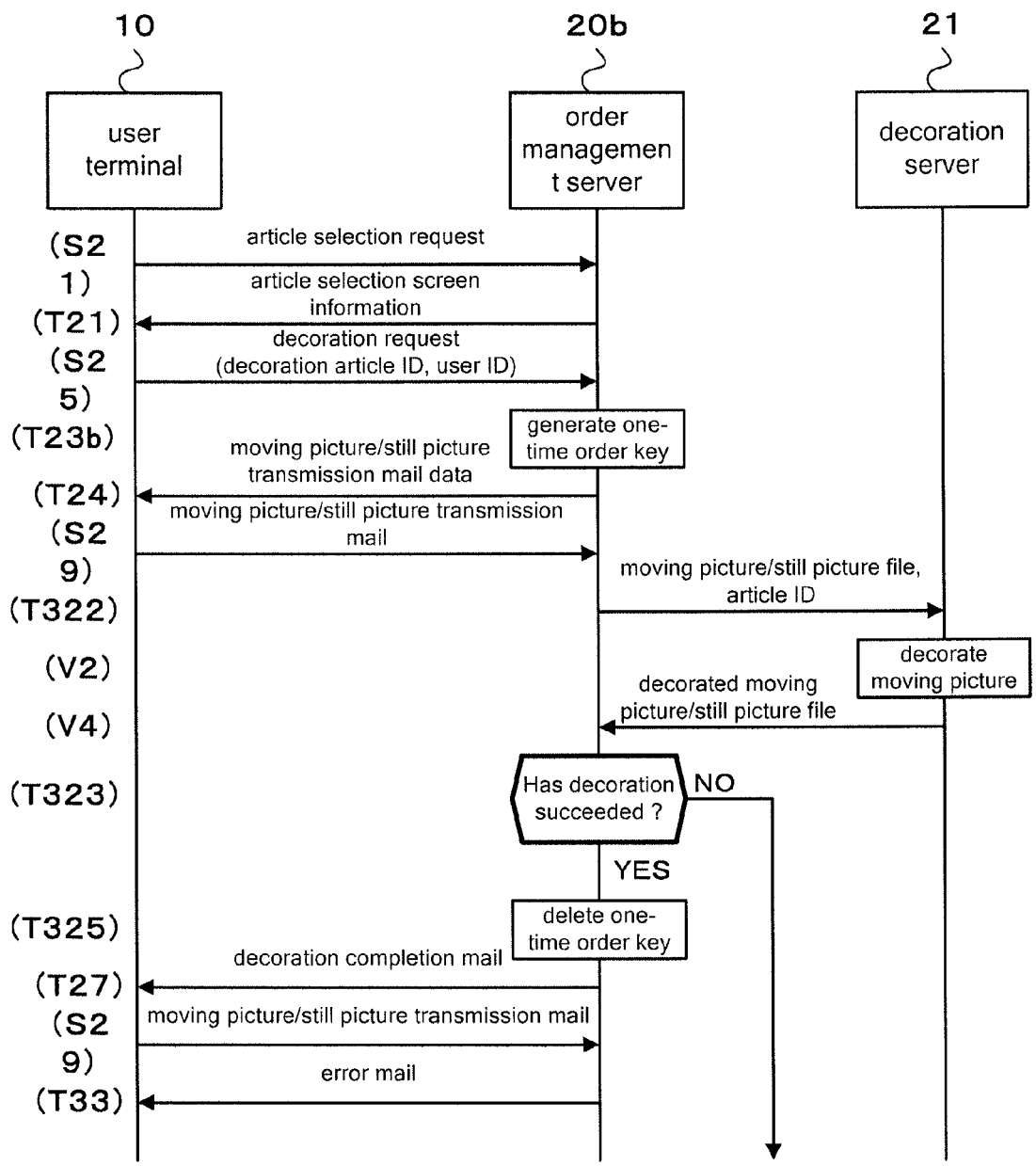
FIG. 39 is a sequence diagram showing an example of an operation of the moving picture/still picture processing system according to the third embodiment of the present invention.

FIG. 39 is a sequence diagram showing an example of an overall operation of moving picture/still picture processing system 1*b*. When the end user accesses an order site using user terminal 10, it transmits an article selection request to order management server 20*b* (at step S21). Order management server 20*b* transmits article selection screen information corresponding to the article selection request to user terminal 10 (at step T21). User terminal 10 displays an article selection screen and transmits an article request that contains a user ID and article ID to order management server 20*b* by the operation of the end user (at step S25).

Order management server 20*b* generates a one-time order key that corresponds to the user ID, the article ID and the received date and time (at step T23*b*). Order management server 20*b* transmits moving picture/still picture transmission mail data that contains the one-time order key to user terminal 10 (at step T24).

User terminal 10 attaches a moving picture/still picture file to moving picture/still picture transmission mail that contains text of the moving picture/still picture transmission mail data and transmits the attached moving picture/still picture transmission mail to order management server 20*b* by the operation of the end user (at step S29).

Order management server 20*b* stores the moving picture/still picture file transmitted from user terminal 10 to NAS 22 and transmits the moving picture/still picture file and the article ID to decoration server 21 (at step T322).

Decoration server 21 decorates the moving picture or still picture according to the decoration method that corresponds to the article ID (at step V2). Decoration server 21 transmits the decorated moving picture/still picture file to order management server 20*b* (at step V4).

Order management server 20*b* determines whether or not decoration server 21 has completed the decoration process (at step T323). If decoration server 21 has succeeded in performing the decoration process (YES at step T323), order management server 20*b* sets the decoration completion flag that corresponds to the moving picture/still picture file to "1" (ON) so as to invalidate the corresponding one-time order key (at step T325).

Order management server 20*b* adds a URL that represents the storage location of the decorated moving picture/still picture file to decoration completion notification mail and transmits the mail to the user terminal (at step T27).

Next, it is assumed that the end user attaches another moving picture to moving picture/still picture transmission mail that has been transmitted and retransmits the moving picture/still picture transmission mail to order management server 20*b*. In this case, if decoration server 21 decorates the moving picture or still picture, decoration server 21 performs the decoration process twice per order. This means that order management server 20*b* and decoration server 21 provide a decoration service twice at a cost of one service. As a result, the benefit to the provider will decrease and an imbalance will occur between users depending on whether they receive the service once or twice at a cost of one service.

When user terminal 10 retransmits moving picture/still picture transmission mail (at step S29), the one-time order key contained in the moving picture/still picture transmission mail has been invalidated since the decoration process has been completed. Thus, order management server 20*b* does not cause decoration server 21 to decorate the moving picture/still picture file, but transmits error mail to user terminal 10 (at step T33).

Thus, order management server 20*b* can prevent a decoration service from being provided a plurality of times per order.

Figure 40:
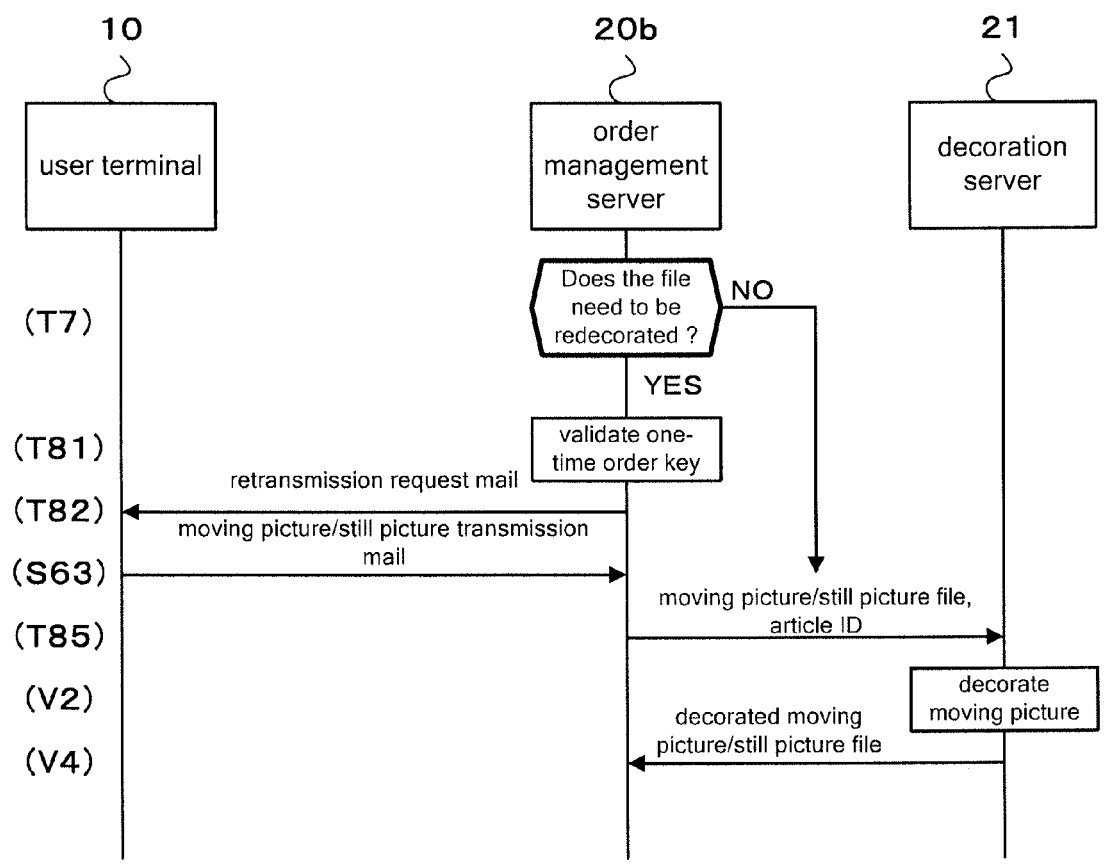
FIG. 40 is a sequence diagram showing an example of the operation of the moving picture/still picture processing system according to the third embodiment of the present invention.

FIG. 40 is a sequence diagram showing an example of an overall operation of moving picture/still picture processing system 1*b* in the case where a decoration process is needed again.

It is assumed that since NAS 22 has failed to store a decorated moving picture/still picture file because of a system error, the moving picture/still picture file needs to be redecorated.

Order management server 20*b* determines that the moving picture/still picture file needs to be redecorated (YES at step T7). Order management server 20*b* sets the invalid flag to "0" (OFF) so as to validate the corresponding one-time order key (at step T81).

Order management server 20*b* transmits retransmission request mail that contains text that requests user terminal 10 to retransmit the moving picture and text of moving picture/still picture transmission mail data to user terminal 10 (at step T82).

User terminal 10 transmits moving picture/still picture transmission mail that contains the moving picture/still picture file corresponding to the moving picture request mail (at step S63).

In this case, although a one-time order key contained in the moving picture/still picture transmission mail is a key that has been transmitted from user terminal 10, since order management server 20*b* has validated the one-time order key, the moving picture/still picture file can be redecorated.

Order management server 20*b* stores the moving picture/still picture file transmitted from user terminal 10 to NAS 22 and transmits the moving picture/still picture file and the article ID to decoration server 21 (at step T85).

Decoration server 21 decorates the moving picture or still picture according to the decoration method corresponding to the article ID (at step V2). Decoration server 21 transmits the decorated moving picture/still picture file to order management server 20*b* (at step V4).

Figure 41:
FIG. 41 is a schematic diagram showing an example of the content of error mail according to the third embodiment of the present invention.

FIG. 41 is a schematic diagram showing an example of the content of error mail. As shown in the drawing, since the decoration process corresponding to one order has been completed, a message that represents that "Your order has been completed" is contained in the error mail.

As described above, according to this embodiment, after order management server 20*b* uses an order key once, since it discards the key, a moving picture/still picture file can be prevented from being decorated a plurality of times per order.

In addition, since functions such as order management function and decoration function are distributed, the burden on the process of order management server 20*b* can be reduced and order management server 20*b* can be easily maintained and managed.

In addition, since order management server 20*b* logically deletes an order key, it can handle contingencies.

Fourth Embodiment

Next, with reference to FIG. 42 and FIG. 43, a fourth embodiment of the present invention will be described. Moving picture/still picture processing system 1c according to this embodiment is different from moving picture/still picture processing system 1 according to the first embodiment in that the former distributes a delivery function for a decorated moving picture/still picture file and a decoration function for that.

Figure 42:
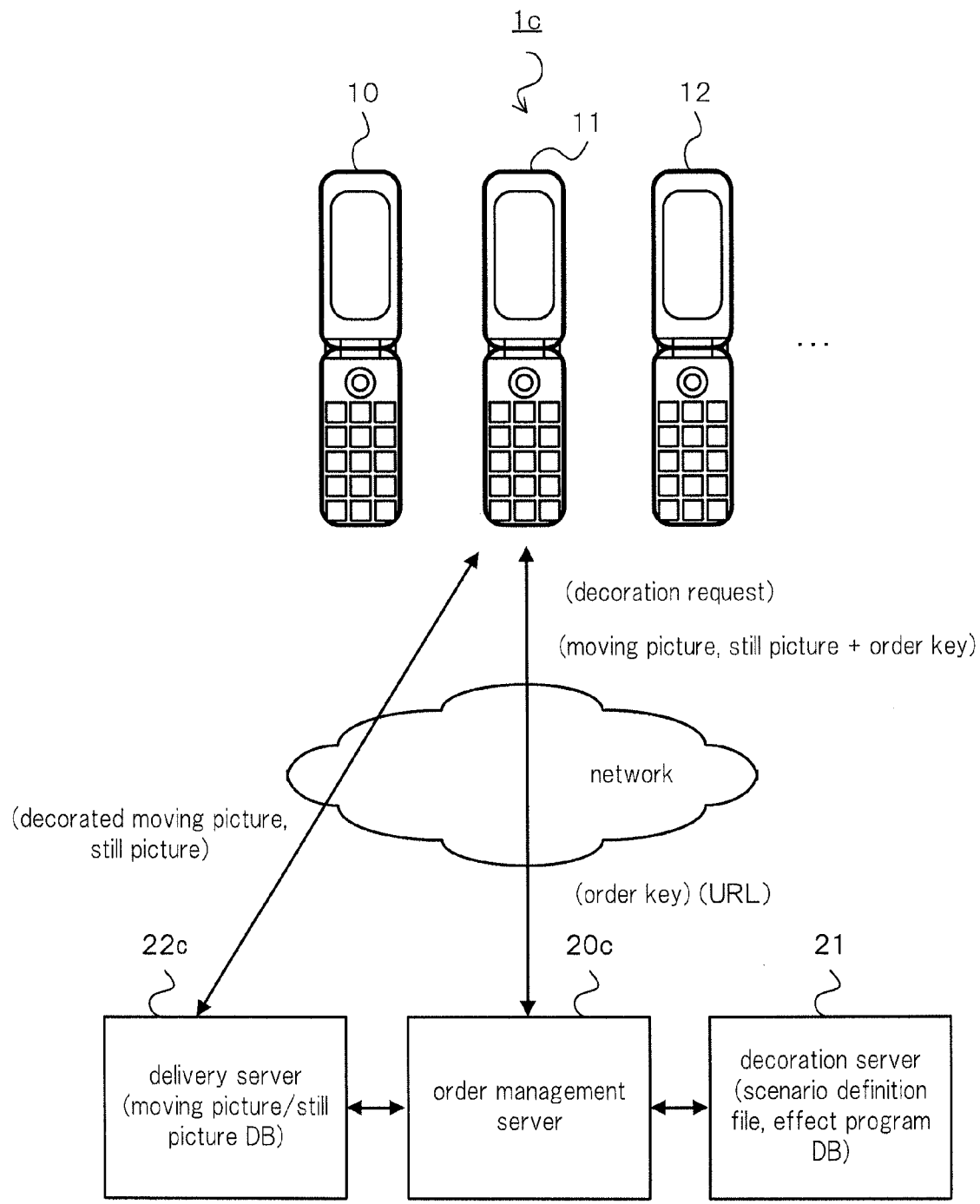
FIG. 42 is an example of an overall schematic diagram showing a moving picture/still picture processing system according to a fourth embodiment of the present invention.

FIG. 42 is an example of an overall schematic diagram showing moving picture/still picture processing system 1c according to this embodiment. Referring to the drawing, moving picture/still picture processing system 1c according to this embodiment is different from the moving picture/still picture processing system according to the first embodiment in that the former has order management server 20c, decoration server 21, and delivery server 22c instead of server 20.

The structure of decoration server 21 according to this embodiment is the same as the structure of decoration server 21 according to the third embodiment. Delivery server 22c has the same function as delivery management section 206 of server 20 described with reference to FIG. 4.

Figure 43:
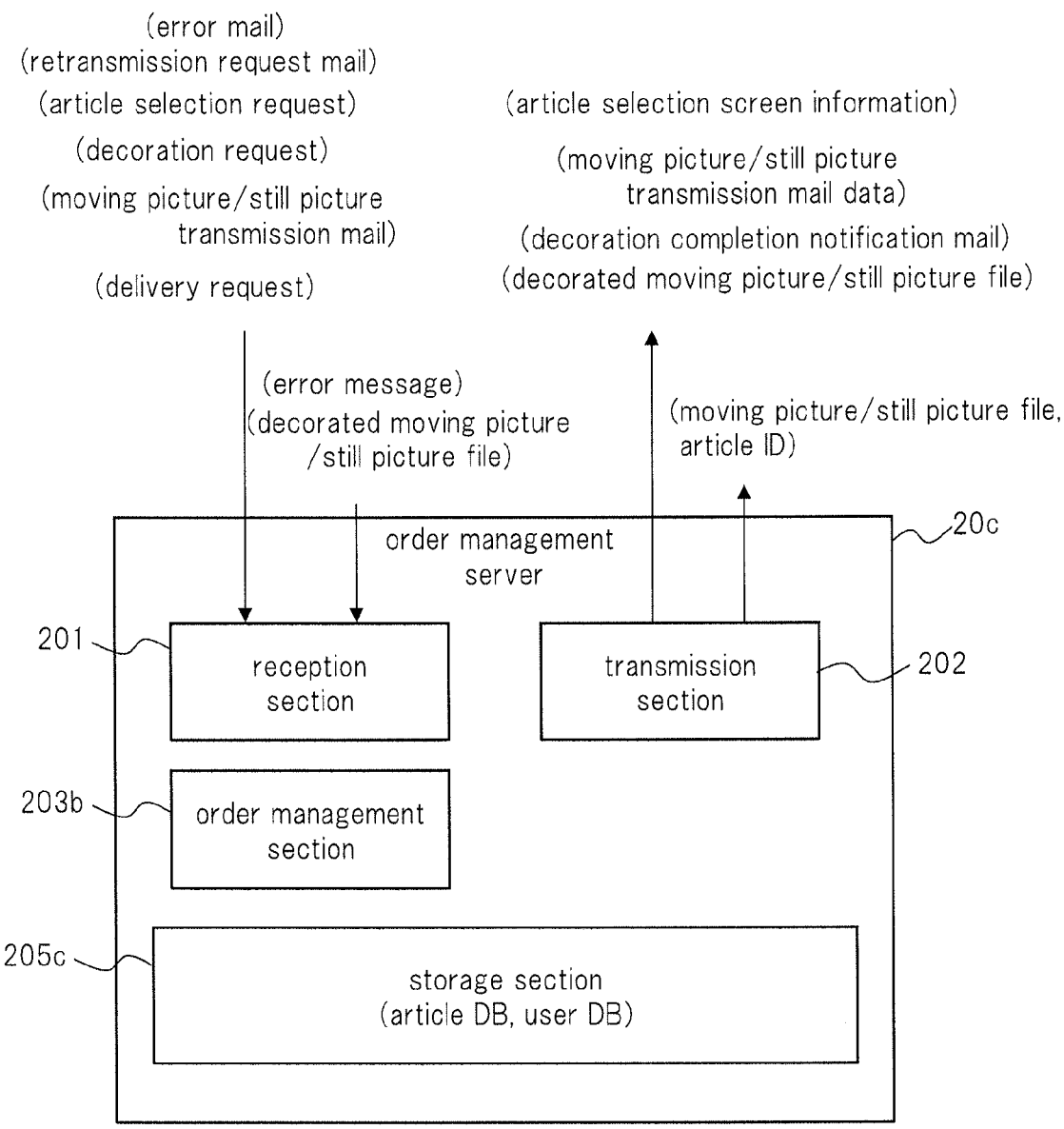
FIG. 43 is a block diagram showing an example of a structure of the order management server according to the fourth embodiment of the present invention.

FIG. 43 is a block diagram showing an example of a structure of order management server 20c. Referring to the drawing, the structure of order management server 20c is the same as the structure of server 20 according to the first embodiment except that the former does not have decoration section 204 and delivery management section 206 and has order management section 203b and storage section 205b instead of order management section 203 and storage section 205.

Storage section 205c stores an article DB and a user DB. A moving picture/still picture DB is located in delivery server 22c. A scenario definition file and an effect program DB are located in decoration server 21.

As described above, according to this embodiment, since not only the decoration function, but also the delivery function is distributed, the burden on the process of order management server 20c can be reduced. In addition, order management server 20c can be easily maintained and managed.

Examples of effects of the present invention are as follows.

When the server generates request identification information according to a decoration method and transmits the information to a communication terminal and then the communication terminal transmits a captured moving picture or still picture that contains the request identification information to the server, it decorates the moving picture or still picture according to the decoration method that corresponds to the request identification information, stores the decorated moving picture or still picture, and delivers the decorated moving picture or still picture corresponding to a delivery request.

Thus, if the end user has a communication terminal that can communicate with the server, he or she can decorate a moving picture or the like at his or her favorite place without it being necessary to go to a place where the server is installed. Thus, the place at which the end user uses the decoration service is not limited. In addition, since the server delivers a stored moving picture or the like that corresponds to a delivery request, the end user can acquire a decorated moving picture or the like at his or her favorite time, not a limited broadcasting time.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2009-257909 filed on Nov. 11, 2009, the content of which is incorporated by reference.

REFERENCE SIGNS LIST 1, 1a, 1b, 1c Moving picture/still picture processing system
10, 11, 12 User terminal
20 Server
20a, 20b Order management server
21 Decoration server
22 NAS
22c Delivery server
30, 31, 32 Management terminal
101 Transmission section
102 Reception section
103 Display section
104 Input section
105 Picture capturing section
106 Storage section
201 Reception section
202 Transmission section
203 Order management section
204 Decoration section
205, 205b, 205c Storage section
206 Delivery management section
207 Article management section

The invention claimed is:

1. A moving picture/still picture processing system, comprising:
a server; and
a communication terminal that communicates with the server through a network,
wherein said communication terminal transmits to said server a request that includes information specifying a decoration method, which is designated by a user, to decorate a moving picture or still picture,
wherein when said server receives said request from said communication terminal, the server generates request identification information that identifies the request, reads and stores said decoration method that is designated in the received request and that is correlated with the request identification information, and transmits the request identification information to the communication terminal,
wherein when said communication terminal receives said request identification information from said server, the communication terminal adds the request identification information to a moving picture or still picture and transmits the moving picture or still picture to the server, and
wherein when said server receives said moving picture or still picture from said communication terminal, the server decorates the moving picture or still picture according to said decoration method corresponding to said request identification information added to the moving picture or still picture, stores the decorated moving picture or still picture, informs said communication terminal of completion of decorating said moving picture or still picture, and if said server receives a delivery request, which specifies a requirement of delivering the decorated moving picture or still picture from said communication terminal, said server will deliver the decorated moving picture or still picture corresponding to said delivery request to said communication terminal.

2. The moving picture/still picture processing system according to claim 1, wherein when said server receives said request from said communication terminal, the server generates said request identification information after a charging process, stores information that specifies said decoration method which is included in said request and that is correlated with the request identification information, in a storage section, and transmits the request identification information to said communication terminal, wherein when said server receives said moving picture or still picture from said communication terminal, the server determines whether or not said request identification information attached to the moving picture or still picture is valid, by referring to said storage section, and then unless the request identification information is valid, said server decorates the moving picture or still picture according to said decoration method corresponding to the request identification information and invalidates the request identification information which is stored in said storage section.

3. The moving picture/still picture processing system according to claim 2, wherein after said server decorates said moving picture or still picture, the server provisionally validates said request identification information corresponding to the moving picture or still picture if the moving picture or still picture needs to be redecorated, transmits to said communication terminal a retransmission request that causes the communication terminal to retransmit the moving picture or still picture to the server and then invalidates said request identification information corresponding to the moving picture or still picture.

4. The moving picture/still picture processing system according to claim 1, wherein said server encrypts said request identification information, which has been generated based on user identification information that identifies a user of the communication terminal, information specifying said decoration method and a time at which these information were processed, using a uni-directional function and transmits the encrypted request identification information to said communication terminal.

5. The moving picture/still picture processing system according to claim 1, wherein said server stores said decorated moving picture or still picture in a predetermined storage location and transmits address information that represents the storage location to said communication terminal, wherein said communication terminal receives said address information from said server and transmits to the server, said delivery request that causes the server to deliver a moving picture or still picture stored in said storage location represented by the address information, and wherein when said server receives said delivery request from said communication terminal, the server reads the decorated moving picture or still picture from said storage location corresponding to the delivery request and delivers the decorated moving picture or still picture to the communication terminal.

6. The moving picture/still picture processing system according to claim 1, wherein said communication terminal adds user identification information that identifies a user of the communication terminal to said request and transmits the request to said server, wherein said server stores said user identification information that has been added to said request and that is correlated with said moving picture or still picture, wherein said communication terminal adds said user identification information to said delivery request and transmits the delivery request to said server, wherein said server determines whether or not said identification information added to said delivery request matches said user identification information corresponding to said decorated moving picture or still picture and if they match, said server delivers the decorated moving picture or still picture to said communication terminal in a format that the communication terminal can save.

7. The moving picture/still picture processing system according to claim 6, wherein if said user identification information added to said delivery request does not match said user identification information corresponding to said decorated moving picture or still picture, said server delivers the decorated moving picture or still picture to said communication terminal in a streaming format in which the decorated moving picture or still picture can be reproduced, but can not be saved.

8. The moving picture/still picture processing system according to claim 1, wherein said information indicating said decoration method, that is included in said request, includes information designating a processing method for a moving picture or still picture and data used for a material in the processing method.

9. The moving picture/still picture processing system according to claim 8, further comprising:

a management terminal that manages data used for said material corresponding to each of said processing methods, wherein when said management terminal receives an edit request, which includes instructions to add, update, or delete any one data item from among data corresponding to said processing methods, from the outside, the management terminal updates the data which will be used by said server, according to instructions of said edit request.

10. The moving picture/still picture processing system according to claim 1, wherein said moving picture includes a sound, and wherein said server also processes said sound.

11. The moving picture/still picture processing system according to claim 1, wherein said server comprises:

an order management server; and a decoration server, wherein said communication terminal transmits to said order management server said request, wherein when said order management server receives said request from said communication terminal, the order management server generates request identification information that identifies the request, stores said decoration method designated in the received request and correlated with the request identification information, and transmits the request identification information to the communication terminal, wherein when said communication terminal receives said request identification information from said server, the communication terminal adds the request identification information to a moving picture or still picture and transmits the moving picture or still picture to the server, wherein when said order management server receives said moving picture or still picture from said communication terminal, the order management server transmits both said decoration method corresponding to said request identification information added to the moving picture or still picture and the moving picture or still picture to said decoration server, wherein when said decoration server receives said decoration method and said moving picture or still picture from said order management server, said decoration server decorates the moving picture or still picture according to the decoration method and transmits the decorated moving picture or still picture to the order management server, and wherein when said order management server receives said decorated moving picture or still picture from said decoration server, the order management server stores the decorated moving picture or still picture, informs said communication terminal of completion of decorating said moving picture or still picture, and if said order management server receives a delivery request, which specifies a requirement of delivering the decorated moving picture or still picture from said communication terminal, said server will deliver the decorated moving picture or still picture corresponding to said delivery request to said communication terminal.

12. The moving picture/still picture processing system according to claim 1, wherein said server comprises:
an order management server; and
a delivery server,
wherein said communication terminal transmits to said order management server said request,
wherein when said order management server receives said request from said communication terminal, the order management server generates request identification information that identifies the request, stores said decoration method that is designated in the received request and that is correlated with the request identification information, and transmits the request identification information to the communication terminal,
wherein when said communication terminal receives said request identification information from said order management server, the communication terminal adds the request identification information to a moving picture or still picture and transmits the resultant moving picture or still picture to the order management server,
wherein when said order management server receives said moving picture or still picture from said communication terminal, the order management server decorates the moving picture or still picture according to said decoration method corresponding to said request identification information added to the moving picture or still picture and transmits the decorated moving picture or still picture to said delivery server,
wherein when said delivery server receives said decorated moving picture or still picture from said order management server, the delivery server stores the decorated moving picture or still picture,
wherein said communication terminal transmits to said delivery server a delivery request that causes the delivery server to deliver said decorated moving picture or still picture to the communication terminal, and wherein when said delivery server receives said delivery request from said communication terminal, the delivery server delivers a moving picture or still picture corresponding to the delivery request.

13. The moving picture/still picture processing system according to claim 2, wherein said server encrypts said request identification information, which has been generated based on user identification information that identifies a user of the communication terminal, information specifying said decoration method and a time at which these information were processed, using a uni-directional function and transmits the encrypted request identification information to said communication terminal.

14. The moving picture/still picture processing system according to claim 3, wherein said server encrypts said request identification information, which has been generated based on user identification information that identifies a user of the communication terminal, information specifying said decoration method and a time at which these information were processed, using a uni-directional function and transmits the encrypted request identification information to said communication terminal.

15. A server, comprising:

a reception section that receives from a communication terminal a request that includes information specifying a decoration method, which is designated by a user, to decorate a moving picture or still picture and also receives the moving picture or still picture that contains request identification information that identifies said request from the communication terminal;

an order management section that generates said request identification information corresponding to said request received by said reception section;

a storage section that stores said decoration method that is designated in said request received by said reception section and that is correlated with said request identification information generated by said order management section and also stores said moving picture or still picture decorated according to the decoration method;

a decoration section that reads said decoration method corresponding to said request identification information added to said moving picture or still picture received by said reception section from said storage section, decorates the moving picture or still picture according to the decoration method, and stores the decorated moving picture or still picture in said storage section; and a delivery management section that informs said communication terminal of completion of decorating said moving picture or still picture, reads said decorated moving picture or still picture from said storage section if said reception section receives a delivery request, which specifies a requirement of delivering the decorated moving picture or still picture from said communication terminal and delivers the decorated moving picture or still picture corresponding to said delivery request to said communication terminal.

16. A moving picture/still picture processing method, comprising:

causing a communication terminal to transmit to a server that communicates with said communication terminal through a network a request that includes information specifying a decoration method, which is designated by a user, to decorate a moving picture or still picture;

causing said server to generate request identification information that identifies said request when the server receives the request from said communication terminal;

causing said server to store said decoration method that is designated in the received request and that is correlated with the request identification information;

causing said server to transmit said request identification information to said communication terminal;

causing said communication terminal to add said request identification information to a moving picture or still picture and transmits the moving picture or still picture to the server when the communication terminal receives the request identification information from the server;

causing said server to decorate said moving picture or still picture according to said decoration method that corresponds to said request identification information added to the moving picture or still picture and store the decorated moving picture or still picture when the server receives the moving picture or still picture from the communication terminal;

causing said server to inform said communication terminal of completion of decorating said moving picture or still picture; and causing said server to deliver said decorated moving picture or still picture corresponding to a delivery request, which specifies a requirement of delivering the decorated moving picture or still picture, to said communication terminal if said server receives said delivery request from said communication terminal.

17. A non-transitory computer-readable data storage medium storing a program that causes a computer to execute procedures, comprising:

a request reception procedure that receives from a communication terminal a request that includes information specifying a decoration method, which is designated by a user, to decorate a moving picture or still picture;

a request identification information generation procedure that generates request identification information that identifies said request received at said request reception procedure;

a procedure that stores said decoration method that is designated in said request received at said request reception procedure and that is correlated with said request identification information generated based on said request identification information generation procedure;

a moving picture/still picture reception procedure that receives a moving picture or still picture that contains said request identification information from said communication terminal;

a decoration procedure that reads a decoration method that corresponds to said request identification information contained in said moving picture or still picture received at said moving picture/still picture reception procedure from said storage section and decorates the moving picture or still picture according to the decoration method;

a procedure that stores said moving picture or still picture decorated based on said decoration procedure in said storage section;

a procedure that informs said communication terminal of completion of decorating said moving picture or still picture; and a delivery procedure that reads said decorated moving picture or still picture from said storage section if a delivery request, which specifies a requirement of delivering the decorated moving picture or still picture, is received from said communication terminal and delivers the decorated moving picture or still picture corresponding to said delivery request to said communication terminal.

* * * * *